(12) United States Patent
Ohkame

(10) Patent No.: US 10,780,403 B2
(45) Date of Patent: Sep. 22, 2020

(54) COMPOSITE SEPARATION MEMBRANE

(71) Applicant: TOYOBO CO., LTD., Osaka-shi, Osaka (JP)

(72) Inventor: Takashi Ohkame, Otsu (JP)

(73) Assignee: TOYOBO CO., LTD., Osaka-shi, Osaka (JP)

( * ) Notice: Subject to any disclaimer, the term of this patent is extended or adjusted under 35 U.S.C. 154(b) by 193 days.

(21) Appl. No.: 15/767,249

(22) PCT Filed: Sep. 1, 2016

(86) PCT No.: PCT/JP2016/075698
§ 371 (c)(1),
(2) Date: Apr. 10, 2018

(87) PCT Pub. No.: WO2017/064936
PCT Pub. Date: Apr. 20, 2017

(65) Prior Publication Data
US 2019/0076791 A1     Mar. 14, 2019

(30) Foreign Application Priority Data

Oct. 13, 2015   (JP) ................................ 2015-201732

(51) Int. Cl.
*B01D 69/10*     (2006.01)
*B01D 69/12*     (2006.01)
(Continued)

(52) U.S. Cl.
CPC ......... *B01D 69/10* (2013.01); *B01D 67/0006* (2013.01); *B01D 69/02* (2013.01);
(Continued)

(58) Field of Classification Search
CPC ...... B01D 69/10; B01D 61/02; B01D 67/006; B01D 69/02; B01D 69/08; B01D 69/12;
(Continued)

(56) References Cited

U.S. PATENT DOCUMENTS

| | | | |
|---|---|---|---|
| 2012/0285881 A1* | 11/2012 | Jikihara | B01D 69/02 210/490 |
| 2015/0209736 A1 | 7/2015 | Ohkame et al. | |
| 2015/0314245 A1* | 11/2015 | Nakao | B01D 69/02 210/500.23 |

FOREIGN PATENT DOCUMENTS

| | | |
|---|---|---|
| JP | 52-111888 A | 9/1977 |
| JP | 55-147106 A | 11/1980 |

(Continued)

OTHER PUBLICATIONS

Lee et al., "Disulfonated poly(arylene ether sulfone) random copolymer thin film composite membrane fabricated using a benign solvent for reverse osmosis applications", Journal of Membrane Science, 2012, vol. 389, pp. 363-371, cited in Specification (9 pages).

(Continued)

*Primary Examiner* — James C Goloboy
(74) *Attorney, Agent, or Firm* — Westerman, Hattori, Daniels & Adrian, LLP

(57) ABSTRACT

A composite separation membrane is disclosed prepared by forming a separation layer on a surface of a porous support membrane, characterized in that the porous support membrane contains 50% by mass or more of polyphenylene ether; that the separation layer is constituted from a first separation layer and a second separation layer; that the first separation layer is formed with a thickness of from 50 nm to 1 μm on the surface of the porous support membrane and is a sulfonated polyarylene ether copolymer which comprises a repeated structure of a specific hydrophobic segment and a specific hydrophilic segment; and that the second separation layer is formed with a thickness of from 1 nm to less than 50 nm on a surface of the first separation layer and is an alternately-layered product constituted from one or more kinds of ionomers.

13 Claims, 2 Drawing Sheets

(51) Int. Cl.
*B01D 71/38* (2006.01)
*B01D 69/02* (2006.01)
*B01D 67/00* (2006.01)
*B01D 71/82* (2006.01)
*B01D 71/52* (2006.01)
*B01D 71/68* (2006.01)
*B01D 61/02* (2006.01)
*B01D 69/08* (2006.01)
*B01D 71/80* (2006.01)

(52) U.S. Cl.
CPC ........... *B01D 69/12* (2013.01); *B01D 69/125* (2013.01); *B01D 71/38* (2013.01); *B01D 71/82* (2013.01); *B01D 61/02* (2013.01); *B01D 69/08* (2013.01); *B01D 71/52* (2013.01); *B01D 71/68* (2013.01); *B01D 71/80* (2013.01); *B01D 2323/30* (2013.01); *B01D 2325/04* (2013.01); *B01D 2325/14* (2013.01)

(58) Field of Classification Search
CPC ...... B01D 69/125; B01D 71/38; B01D 71/52; B01D 71/68; B01D 71/80; B01D 71/82; B01D 2323/30; B01D 2325/04; B01D 2325/14
See application file for complete search history.

(56) References Cited

FOREIGN PATENT DOCUMENTS

| | | | |
|---|---|---|---|
| JP | 62-95105 A | 5/1987 | |
| JP | 63-248409 A | 10/1988 | |
| JP | 4-367715 | 12/1992 | |
| JP | 3250644 B2 | 1/2002 | |
| JP | 2013-223852 A | 10/2013 | |
| JP | 5578300 B1 | 8/2014 | |
| WO | 2014/054346 A1 | 4/2014 | |
| WO | WO-2014092107 A1 * | 6/2014 | ............. B01D 69/12 |
| WO | 2015/141653 A1 | 9/2015 | |

OTHER PUBLICATIONS

International Search Report dated Sep. 27, 2016, issued in counterpart International Application No. PCT/JP2016/075698 (2 pages).
Notification of Transmittal of Translation of the International Preliminary Report on Patentability (Form PCT/IB/338) issued in counterpart International Application No. PCT/JP2016/075698 dated Apr. 26, 2018, with Forms PCT/IB/373 and PCT/ISA/237. (7 pages).

* cited by examiner

[Fig. 1]
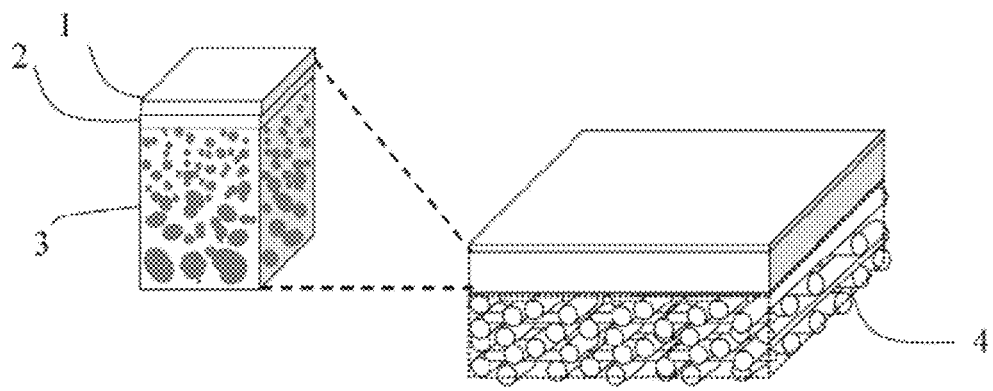
[Fig. 2]
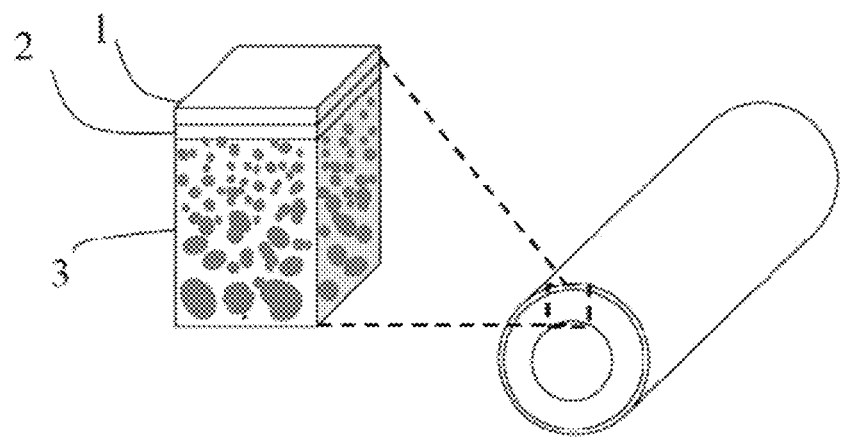

[Fig. 3]
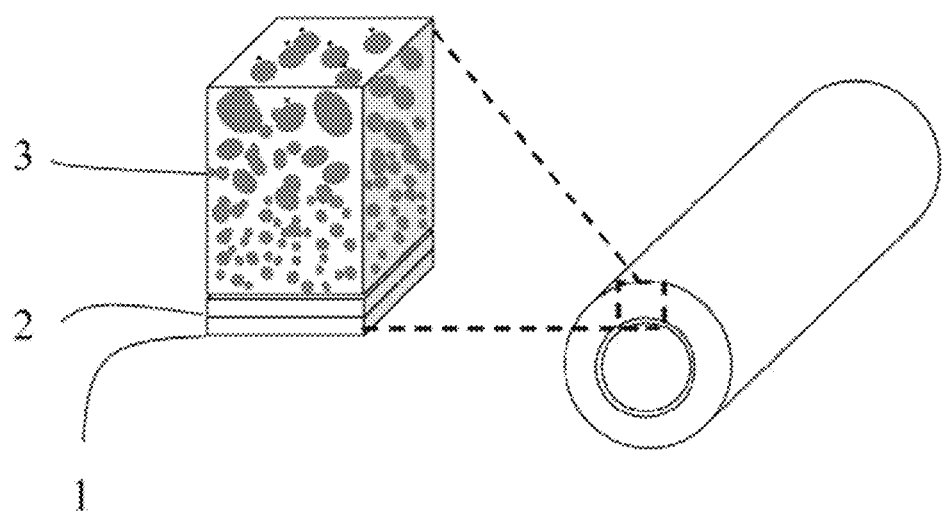
[Fig. 4]
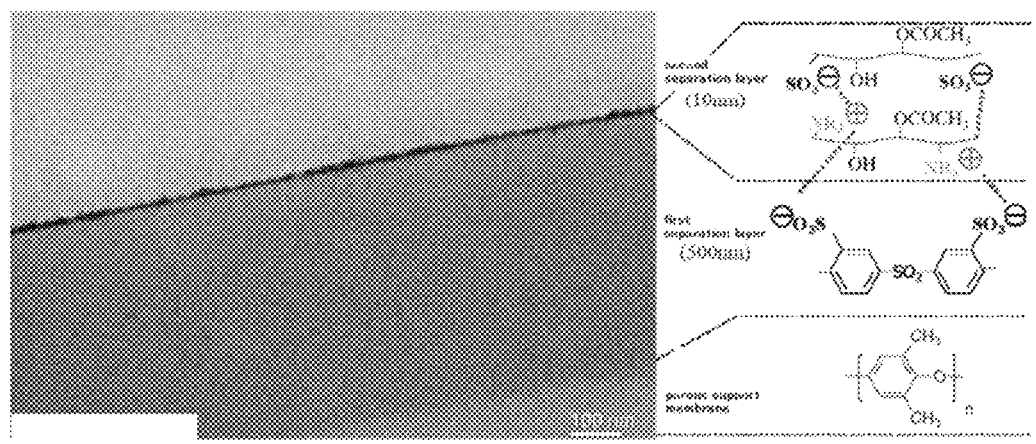

COMPOSITE SEPARATION MEMBRANE

TECHNICAL FIELD OF THE INVENTION

The present invention relates to a composite separation membrane being suitable as a liquid treating membrane or, particularly, as a nanofiltration membrane and a reverse osmosis membrane. The composite separation membrane of the present invention has an excellent water permeability in spite of its drastic improvement of low fractionation characteristics to neutral low molecules which is a disadvantage in a conventional sulfonated polyarylene ether composite separation membrane. In addition, the composite separation membrane of the present invention has a long life because it can well maintain a membrane property against a long-time exposure to chlorine, acid and alkali. The present invention also relates to a method for producing the same.

BACKGROUND ART

A nanofiltration membrane and a reverse osmosis membrane has a pore size which is in a level of from nanometers to angstroms or has a film structure which is considered to have no clear pore. Therefore, these membranes have a high resistance to a filtration whereby an amount of water permeation is apt to become small. Accordingly, as the nanofiltration membrane and the reverse osmosis membrane, there has been preferably used such a structure of a composite separation membrane wherein a thin film of a separation layer having a separating function is formed as thin as possible and without any deficiency on a surface of a porous support membrane being excellent in a mechanical strength and a water permeability whereby both of a high water permeability and a high separating property are achieved. Further, as a polymer which constitutes a separation layer, it has been demanded to be excellent in a chemical resistance or, particularly, in a resistance to chlorine and alkali in view of a washability and a stability in a long-term use.

As to a structure of conventional composite separation membranes, there is a structure wherein thin film of cross-linked aromatic polyamide is formed on a surface of a porous support membrane by means of an interfacial polymerization method. For example, in Patent Document 1, there is disclosed a composite product in a sheet form wherein thin film of cross-linked polyamide is formed on a surface of a porous support membrane by the interfacial polymerization method.

In Patent Document 2, there is disclosed a hollow fiber composite separation membrane wherein thin film of cross-linked polyamide is formed on a surface of a porous support membrane in a hollow fiber form by the interfacial polymerization method.

In Patent Document 3, there is also disclosed a method for forming a hollow fiber composite separation membrane wherein thin film of cross-linked polyamide is formed on a surface of a porous support membrane in a hollow fiber form by the interfacial polymerization method. In said method, a step of impregnating a solution comprising a fluorine compound is added to a step of compositing by the interfacial polymerization method so as to form a hollow fiber composite separation membrane having a more uniform separation layer.

As to a synthetic polymer other than polyamide materials which can be applied to the nanofiltration membrane and the reverse osmosis membrane, there is a polymer having an ionic functional group such as sulfonic acid group in a molecule. For example, the Patent Document 4 discloses a method for preparing a composite separation membrane wherein sulfonated polyarylene ether is dissolved in a solvent consisting of formic acid and the resulting coating solution is applied on a surface of a porous support membrane followed by drying to form a coat.

The nanofiltration membrane and the reverse osmosis membrane by the polyamide-type composite separation membrane as mentioned in Patent Document 1 are excellent in their salt rejection property and water permeation property. However, their resistance to chlorine is low whereby it is impossible to treat water containing sodium hypochlorite and it is also impossible to be washed with chlorine. Therefore, it is necessary to supply a dechlorinated solution to a membrane desalination unit and then to add sodium hypochlorite again to the resulting permeate. As a result, a membrane treatment process is complicated and a cost therefor is high.

In Patent Documents 2 and 3, there is also a disadvantage that the resistance to chlorine is low because it is a polyamide-type composite separation membrane. Moreover, there is also a problem that a process wherein a structure formation is conducted by the interfacial polymerization method in a step of producing a composite separation membrane of a hollow fiber type is complicated compared with a flat sheet membrane or a sheet-shaped product.

A composite separation membrane having sulfonated polyarylene ether (SPAE) in a separation layer as disclosed in the Patent Document 4 has a high chemical stability due to a polyarylene ether molecular skeleton. Therefore, such composite separation membrane is highly excellent in its resistance to chlorine and is washable by sodium hypochlorite whereby it is preferred in terms of a practical use.

However, as pointed out in Non-Patent Document 1 for example, a chemical structure of SPAE is similar to that of polysulfone or polyether sulfone which is a polymer material for common porous support membranes. Therefore, most of solvents which can dissolve SPAE also can dissolve polysulfone or polyether sulfone. When the solvent as such is used as a coating solution and applied on a porous support membrane, the porous support membrane is dissolved or significantly swollen whereby composite membrane cannot be prepared.

Accordingly, it is inevitable to select a limitative solvent (lower carboxylic acid such as formic acid, alcohol, alkylene diol or triol, or alkylene glycol alkyl ether) which does not invade a porous support membrane formed of polysulfone or polyether sulfone. However, such a solvent also inevitably tends to have a low solubility to SPAE. Particularly, as for SPAE which has a rigid molecular structure, only few solvents can dissolve it. When a composite separation membrane is prepared using a solvent having insufficient solubility to SPAE, a coat of SPAE is hardly adhesive to a porous support membrane whereby separation characteristics tend to become insufficient. As a result, properties are apt to lower after a long period due to a peeling of the coat.

In order to solve the problem as such, the applicant has proposed a composite separation membrane prepared by applying, on a surface of a porous support membrane mainly comprising polyphenylene ether, an SPAE copolymer which is excellent in a resistance to chemicals such as chlorine, acid and alkali, has a rigid molecular skeleton and is excellent in separation characteristics (see Patent Document 5).

Although the separation layer of SPAE disclosed in the Patent Document 5 is excellent in an inhibition property for univalent ions or polyvalent ions, its inhibition property for neutral low molecules (i.e. low molecules having no ionic functional group) or particularly for substances having a molecular weight of 400 or less is not sufficient. To be more specific, it is possible to enhance the inhibition property for the neutral low molecules by precisely forming the SPAE separation layer within a range of an art of the preparation method of the Patent Document 5. However, in compensation therefor, a water permeability of the membrane significantly lowers than a practical level. Therefore, it has not been easy to prepare a composite separation membrane which efficiently inhibits the substances having the molecular weight of substantially 400 or less.

PRIOR ART DOCUMENTS

Patent Documents

Patent Document 1: Japanese Patent Application Laid-Open (JP-A) No. 147106/80
Patent Document 2: Japanese Patent Application Laid-Open (JP-A) No. 95105/87
Patent Document 3: Japanese Patent No. 3250644
Patent Document 4: Japanese Patent Application Laid-Open (JP-A) No. 248409/88
Patent Document 5: Japanese Patent No. 5578300

Non-Patent Documents

Non-Patent Document 1: Chang Hyun Lee et al., Journal of Membrane Science, 389 (2012), 363-371, "Disulfonated poly(arylene ether sulfone) random copolymer thin film composite membrane fabricated using a benign solvent for reverse osmosis applications"

DISCLOSURE OF THE INVENTION

Problem that the Invention is to Solve

The present invention has been achieved for overcoming the above problems in the prior art and its object is to provide a composite separation membrane having a separation layer comprising SPAE on a surface of a porous support membrane wherein fractionation characteristics for neutral low molecule are drastically improved, a water permeability is high, the porous support membrane and the separation layer are strongly adhered, and excellent separation characteristics and water permeability continue for a long period even upon exposure to chlorine, acid and alkali. Another aim of the present invention is to provide an advantageous method for producing the same.

Means for Solving the Problem

In order to achieve the above object, the inventors have conducted eager investigations for overcoming the problems in the composite separation membrane particularly proposed in the above Patent Document 5. As a result, they have found that, when a very thin separation layer of an ionomer (the second separation layer) is formed on a surface of the SPAE separation layer (the first separation layer) of the above composite separation membrane by means of an alternate layer-by-layer method, it is now possible to drastically improve the inhibition property to the neutral low molecule having the molecular weight of 400 or less and further to achieve the high water permeability and resistance to chemicals whereby the present invention has been accomplished.

The present invention has been accomplished on the basis of the above findings and consists of the constitutions of the following [1] to [7].

A composite separation membrane for separating an ion and a solute from a liquid, prepared by forming a separation layer on a surface of a porous support membrane, characterized in that the composite separation membrane satisfies conditions of the following (1) to (4):

(1) the porous support membrane contains 50% by mass or more of polyphenylene ether;
(2) the separation layer is constituted from a first separation layer and a second separation layer;
(3) the first separation layer is formed with a thickness of from 50 nm to 1 μm on the surface of the porous support membrane and is a sulfonated polyarylene ether copolymer which comprises a repeated structure of a hydrophobic segment represented by the following formula (IV) and a hydrophilic segment represented by the following formula (V), wherein said hydrophobic segment comprises a repeated structure of a hydrophobic segment and a hydrophilic segment; and
(4) the second separation layer is formed with a thickness of from 1 nm to less than 50 nm on a surface of the first separation layer and is an alternately-layered product constituted from one or more kind(s) of ionomer(s).

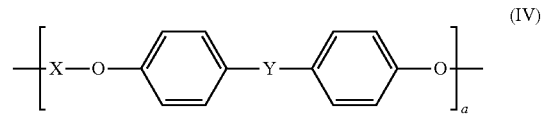

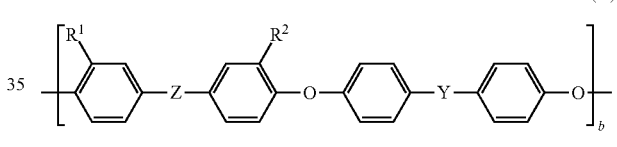

wherein

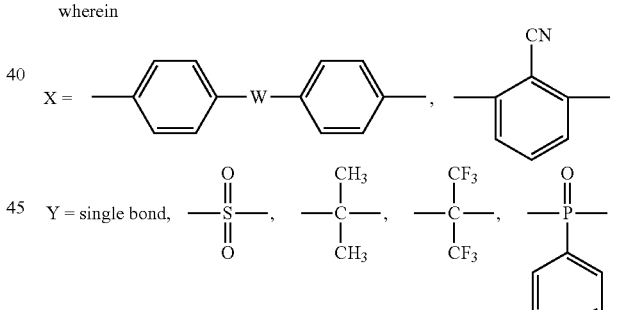

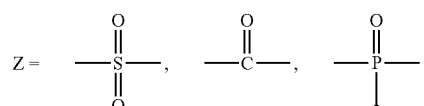

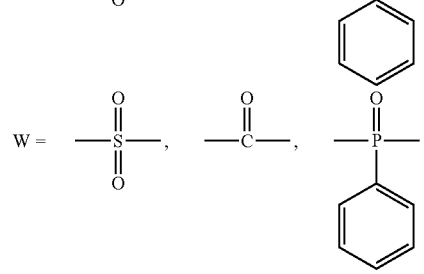

wherein Y and W are not selected as the same thing;
wherein a and b each represents a natural number of 1 or more;

wherein $R^1$ and $R^2$ each represents —$SO_3M$ or —$SO_3H$, wherein M represents a metal element; and wherein a sulfonation rate in terms of a percent rate of a repeating number of the formula (V) in the sulfonated polyarylene ether copolymer to a total of a repeating number of the formula (IV) and the repeating number of the formula (V) in the sulfonated polyarylene ether copolymer is more than 5% and less than 80%.

The composite separation membrane according to [1], wherein the sulfonated polyarylene ether copolymer constituting the first separation layer consists of a hydrophobic segment represented by the following formula (I) and a hydrophilic segment represented by the following formula (II).

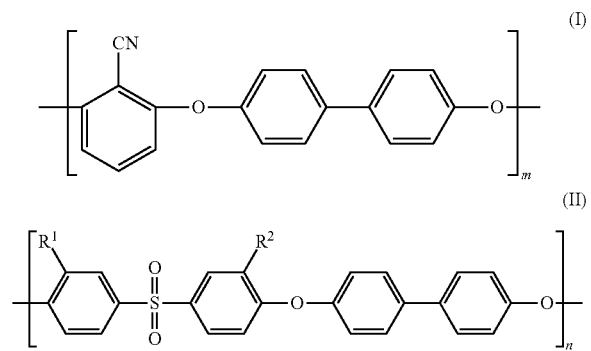

wherein m and n each represents a natural number of 1 or more;

$R^1$ and $R^2$ each represents —$SO_3M$ or —$SO_3H$, wherein M represents a metal element; and a sulfonation rate in terms of a percent rate of a repeating number of the formula (II) in the sulfonated polyarylene ether copolymer to a total of a repeating number of the formula (I) and the repeating number of the formula (II) in the sulfonated polyarylene ether copolymer is more than 5% and less than 80%.

The composite separation membrane according to [1] or [2], wherein at least one kind of the ionomer constituting the alternately-layered product of the second separation layer is polyvinyl alcohol having a cationic functional group or polyvinyl alcohol having an anionic functional group, and wherein a part of hydroxyl groups of the polyvinyl alcohol ingredient has been subjected to a cross-linking treatment by aldehyde.

The composite separation membrane according to any of [1] to [3], wherein the porous support membrane contains 80% by mass or more of polyphenylene ether.

[5] The composite separation membrane according to any of [1] to [4], wherein the thickness of the second separation layer is from 1 nm to 30 nm.

[6] A method for producing the composite separation membrane mentioned in any of [1] to [5], comprising a step of applying a coating solution on a surface of a porous support membrane containing 50% by mass or more of polyphenylene ether, wherein the coating solution has been prepared by dissolving a sulfonated polyarylene ether copolymer in an aprotic polar solvent containing at least one member selected from dimethyl sulfoxide, N,N-dimethylacetamide, N,N-dimethylformamide, N-methyl-2-pyrrolidone and γ-butyrolactone; a step of subjecting the applied surface to a drying treatment within such a temperature range wherein the solvent does not dissolve the porous support membrane of polyphenylene ether, so as to prepare a composite separation membrane having a first separation layer; and a step of alternately contacting an aqueous solution of at least one kind of ionomer with a surface of the first separation layer, so as to form a second separation layer.

[7] The method for producing the composite separation membrane according to [6], wherein the method further comprises a step of contacting the second separation layer with an aqueous solution of aldehyde during and/or after forming the second separation layer, so as to subject the second separation layer to a cross-linking treatment.

Advantages of the Invention

In the composite separation membrane according to the present invention, a separation layer (the first separation layer) comprising specific SPAE is formed on a surface of a porous support membrane comprising polyphenylene ether as a main ingredient. Accordingly, an adhesion of the porous support membrane to the SPAE separation layer (the first separation layer) is very good. Further, in the composite separation membrane of the present invention, a very thin separation layer of an ionomer (the second separation layer) is formed on a surface of the SPAE separation layer (the first separation layer). Accordingly, it is now possible to give a high inhibition property against neutral low molecules which has been a weak point in the SPAE separation layer and also to retain a high water permeability. Still further, the composite separation membrane of the present invention can keep excellent separation characteristics and water permeability for a long period even being exposed to chlorine, acid and alkali. Therefore, it is long-life and is advantageously used as a water treating membrane or particularly as a nanofiltration membrane and a reverse osmosis membrane.

BRIEF DESCRIPTION OF THE DRAWINGS

FIG. 1 is a schematic view of an example of the composite separation membrane of the present invention (flat sheet membrane).

FIG. 2 is a schematic view of an example of the composite separation membrane of the present invention (hollow fiber membrane).

FIG. 3 is a schematic view of another example of the composite separation membrane of the present invention (hollow fiber membrane).

FIG. 4 is an enlarged image under an SEM (scanning electron microscope) of a membrane cross section of an example of the composite separation membrane of the present invention.

BEST MODE FOR CARRYING OUT THE INVENTION

The composite separation membrane according to the present invention is characterized in that there is a first separation layer on a surface of a porous support membrane containing polyphenylene ether as a main ingredient, that the first separation layer comprises a sulfonated polyarylene ether copolymer comprising a specific repeated structure, that there is further a second separation layer on a surface of the first separation layer and that the second separation layer is a very thin alternately-layered product constituted from at least one ionomer.

The composite separation membrane of the present invention is advantageous as a liquid treating membrane or particularly as a nanofiltration membrane and a reverse osmosis membrane. The nanofiltration membrane and the reverse osmosis membrane are separation membranes having a dense separation layer in a film form which has a pore size of several nanometers or less or which is regarded to have no clear pore. These membranes are used for separating a solute such as low-molecular organic molecules (e.g. glucose) or inorganic salts from a solution. The nanofiltration membrane has a larger pore size than the reverse osmosis membrane and is a liquid treating membrane by which low molecular organic molecules, divalent ions and polyvalent ions can be partially removed. The reverse osmosis membrane has a smaller pore size than the nanofiltration membrane and is a liquid treating membrane by which even monovalent ions such as sodium ion can be almost completely separated and removed.

In the composite separation membrane of the present invention, thin film comprising specific SPAE is formed on a surface of a porous support membrane having surface pores of about 10 nm to several tens nm in diameter as a first separation layer and a very thin alternately-layered product is formed on a surface of the first separation layer as a second separation layer. Here, the thin film of the first separation layer in the present invention means a membrane which can substantially be formed by a polymer application method and has an applied thickness without resulting any deficiency and without making a water permeation resistance high. A thickness thereof is from 50 nm to 1 μm. On the other hand, the very thin alternately-layered product of the second separation layer means an adsorption layer of an ionomer being formed by means of an alternate layer-by-layer method and is such a membrane wherein a thickness of the separation layer which can be formed substantially without any deficiency is from 1 nm to less than 50 nm. A thickness of the porous support membrane is well thicker than the thin film and is at least 5 μm or more. In the case of a flat sheet membrane as shown in FIG. 1, a porous support membrane 3 is placed on nonwoven fabric 4 such as polyester, thin film of a first separation layer 2 is formed on a surface of the porous support membrane 3, and a second separation layer 1 is formed on a surface of the first separation layer 2. In the case of a hollow fiber membrane as shown in FIGS. 2 and 3, thin film of a first separation layer 2 is formed on a porous support membrane 3 in a hollow fiber form, and a second separation layer 1 is formed on a surface of the first separation layer 2. FIG. 4 shows an enlarged image under an SEM of a membrane cross section of an example of the composite separation membrane of the present invention.

On the other hand, as a membrane structure which is different from a composite separation membrane of the present invention, there is an asymmetric membrane. An asymmetric membrane is a membrane prepared by coagulation of a dope for membrane preparation by means of a phase separation method, and is controlled so as to make a surface layer of the membrane dense and, an inner layer side of the membrane porous. Although the asymmetric membrane may be constituted from one or more kind(s) of polymer component(s) using a polymer blending method or the like, it is basically a membrane prepared only by controlling a gradient of polymer density in the membrane and, in a separation layer and a porous support layer, polymer component(s) is/are the same. It is general that, in a composite separation membrane, structure and thickness of the porous support membrane and structure and thickness of the separation layer can be independently controlled and, therefore, a water permeation property becomes higher. Due to these reasons, the composite separation membrane is preferred as a membrane structure.

Now a porous support membrane, a first separation layer, and a second separation layer of the composite separation membrane of the present invention and a method for producing the same will be successively illustrated in detail.

Polyphenylene ether used in a porous support membrane of the composite separation membrane of the present invention is represented by the following formula (III).

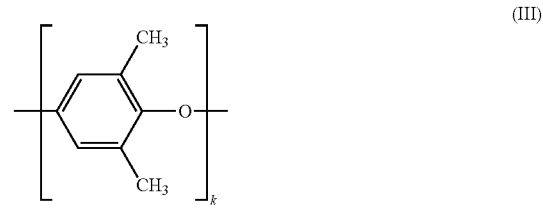

In the above formula (III), k is a natural number of 1 or more.

Number-average molecular weight of polyphenylene ether is preferred to be 5,000 to 500,000. Within such a range, it is soluble at high temperature in a part of aprotic polar solvents selected from N-methyl-2-pyrrolidone (NMP), N,N-dimethylacetamide (DMAc), dimethyl sulfoxide (DMSO), N,N-dimethylformamide (DMF), γ-butyrolactone (GBL) and a solvent containing at least one of them (hereinafter, the above is referred to as "solvent group 1") and a viscosity of a dope for membrane preparation becomes sufficient whereby a porous support membrane having sufficient strength can be prepared.

In view of enhancing a strength of a porous support membrane or optimizing membrane properties, polyphenylene ether may be subjected to a polymer blending using polystyrene which has been known to be completely compatible with polyphenylene ether or using various kinds of polymers. Alternatively, a filler may be contained in polyphenylene ether. Further, in view of imparting a hydrophilicity to a porous membrane of polyphenylene ether which is a hydrophobic polymer, an ionic surfactant, a nonionic surfactant or a hydrophilic polymer such as polyethylene glycol or polyvinylpyrrolidone may be contained therein. However, a rate of polyphenylene ether constituting a porous support membrane is preferred to be 50% by mass or more. It is more preferred to be 80% by mass or more. When it is within the above range, a polyphenylene ether porous support membrane is not invaded by the solvent group 1 but characteristics of polyphenylene ether (i.e. a high mechanical strength and a resistance to chemicals) are still maintained whereby it is advantageous in steps for producing a composite separation membrane.

As to a solvent for preparing a porous support membrane from polyphenylene ether, N-methyl-2-pyrrolidone (NMP), N,N-dimethylacetamide (DMAc) and N,N-dimethylformamide (DMF) are preferred among the aprotic polar solvents of the solvent group 1. This is because they are the so-called "latent solvents" which can afford a uniform dope for membrane preparation at a high temperature of, for example, about 60° C. or higher while, at a temperature of lower than the above, polyphenylene ether is insoluble therein. However, with regard to a temperature range wherein polyphenylene ether is soluble in the latent solvents, it may vary depending upon a molecular weight of polyphenylene ether, a polymer concentration of the dope for membrane preparation and an interaction among a separately added substance, the polymer and the latent solvent and, accordingly, it should be appropriately adjusted. Among the above, N-methyl-2-pyrrolidone is particularly preferred since a stability of the dope for membrane preparation is good. On the other hand, dimethyl sulfoxide, γ-butyrolactone, etc. among the solvent group 1 are the non-solvents which do not dissolve polyphenylene ether even under a high temperature condition of 100° C. or higher. Therefore, they are not so preferred as the solvents for membrane preparation for preparing a porous support membrane.

The "latent solvent" in the present invention is such a solvent that, in a dope for membrane preparation of a porous support membrane, there exists Flory's theta temperature inherent to the solvent (a temperature by which an interaction acting among segments of a polymer chain is apparently zero or, in other words, a temperature wherein the second virial coefficient is zero) to the polymer which is a solute (it is polyphenylene ether in the present invention) and the theta temperature is an ordinary room temperature or lower than a boiling point of the solvent. When a temperature is higher than the theta temperature, a uniform dope for membrane preparation is obtained while, when it is lower than the theta temperature, the polymer is insoluble in the solvent. Actually, the apparent theta temperature of a dope for membrane preparation in the present invention varies to some extent depending upon a polymer concentration and a solvent composition. The term "good solvent" stands for such a solvent wherein, in a dope for membrane preparation, a repulsive force acting among the segments of polymer chain is more than an attractive force and a uniform dope for membrane preparation can be obtained at an ordinary room temperature regardless of the temperature. The term "non-solvent" stands for such a solvent wherein there exists no theta temperature or the theta temperature is extremely high whereby the polymer is entirely insoluble regardless of the temperature.

As to polyphenylene ether, it has been known that, besides the above-mentioned latent solvents, there exist also good solvents in which polyphenylene ether is soluble even at an ordinary room temperature. As summarized in known literatures (for example, please refer to G. Chowdhury, B. Kruczek, T. Matsuura, Polyphenylene Oxide and Modified Polyphenylene Oxide Membranes Gas, Vapor and Liquid Separation, 2001, Springer), non-polar solvents (hereinafter, abbreviated as the solvent group 3) such as carbon tetrachloride, carbon disulfide, benzene, toluene, chlorobenzene, dichloromethane and chloroform have been known. Those solvents can dissolve polyphenylene ether at an ordinary room temperature. However, unlike the above-mentioned solvent group 1, those solvents exhibit a big environmental load and a very high harmfulness to human body whereby their industrial use as a dope for membrane preparation is not preferred.

As to a means for preparing a porous support membrane from a dope for membrane preparation wherein polyphenylene ether is dissolved in the above latent solvent, it is preferred to use a wet and a dry-wet phase inversion method for membrane preparation. A wet phase inversion method for membrane preparation is such a method wherein a dope for membrane preparation in a homogeneous solution form is immersed in a coagulation bath consisting of a non-solvent which is miscible with a good solvent in the dope but a polymer in the dope is insoluble therein and then the polymer is subjected to a phase separation to separate therefrom whereby a membrane structure is formed. A dry-wet phase inversion method for membrane preparation is such a method wherein, immediately before the dope is immersed in a coagulation bath, a solvent is evaporated/dried for a predetermined period from a surface of the dope to give an asymmetric structure wherein a polymer density on a membrane surface layer becomes much dense. In the present invention, it is more preferred to choose a dry-wet phase inversion method for membrane preparation.

In the composite separation membrane of the present invention, although the shape of the membrane is not particularly limited, it is preferred to be a flat sheet membrane or a hollow fiber membrane. Any of the membrane as such may be prepared by a conventional method which has been known by persons skilled in the art. In the case of a flat sheet membrane for example, it can be prepared by such a manner that a dope for membrane preparation is subjected to casting on a substrate followed, if desired, by giving a drying period for a predetermined period and is then immersed in a coagulation bath. In the case of a hollow fiber membrane, it can be prepared by such a manner that a dope for membrane preparation is discharged from outer slits of spinning nozzles of a double cylindrical type so that the dope becomes in a hollow cylindrical shape while, from inner pores of nozzle inside thereof, a fluid selected from a non-solvent, a latent solvent, a good solvent or a mixed solvent thereof, a liquid which is not compatible with a solvent for membrane preparation and a gas such as nitrogen or air is extruded together with the dope followed, if desired, by giving a drying period for a predetermined period and is then immersed in a coagulation bath.

A concentration of polyphenylene ether in a dope for membrane preparation is preferred to be 5% by mass to 60% by mass in such a view that a mechanical strength of a support membrane is kept sufficient and, at the same time, a water permeation property and a surface pore size of the porous support membrane are made appropriate. It is more preferred to be 10% by mass to 50% by mass.

A temperature of the dope for membrane preparation is preferred to be 40° C. or higher. It is more preferred to be 60° C. or higher. An upper limit of the temperature is preferred to be a boiling point of the above solvent for membrane preparation or lower, more preferred to be 150° C. or lower, and further preferred to be lower than 100° C. When the temperature of the dope for membrane preparation is lower than the above range, a temperature of polyphenylene ether becomes the above-mentioned theta temperature or lower and a polymer is separated out whereby it is not preferred. In view of the experience of the present inventors, a solidified product of polyphenylene ether prepared when the above dope for membrane preparation is allowed to stand at theta temperature or lower is fragile whereby it is not preferred as a separation membrane. More preferred membrane structure can be obtained rather by such a means that the dope which is at the theta temperature or higher and is in a homogeneous state is immersed in a coagulation bath filled with a non-solvent, leading to a non-solvent-induced phase separation and the membrane structure formation. On the other hand, when the temperature of the dope for membrane preparation is too higher than the above range, a viscosity of the dope lowers and a shape formation becomes difficult whereby it is not preferred. Also, an evaporation rate of a good solvent in the dope and a solvent exchange rate in the coagulation bath become too high. Accordingly, a polymer density on a membrane surface becomes too dense whereby a water permeation property as a support membrane significantly lowers.

In a dry-wet phase inversion method for membrane preparation, a predetermined drying time for the solvent is given before a step wherein a dope for membrane preparation is immersed in a coagulation bath. The drying time and temperature are not particularly limited but should be adjusted in such a manner that the finally obtained asymmetric structure of a porous support membrane becomes a desired one. It is preferred that, for example, the solvent is partly dried for 0.01 to 600 second(s) at an environmental temperature of 5 to 200° C.

With regard to a non-solvent for a coagulation bath used for a wet phase inversion method for membrane preparation or a dry-wet phase inversion method for membrane preparation, it is not particularly limited and, in accordance with the known membrane preparation method, it is preferred to be water, alcohol and polyhydric alcohol (such as ethylene glycol, diethylene glycol, triethylene glycol or glycerol). A mixed liquid thereof is also acceptable. In view of simplicity and economy, it is preferred that water is contained therein as a component.

Similarly, other substances may be also added to the non-solvent of the coagulation bath in accordance with the known membrane preparation method. For example, in such a view that a solvent exchange rate in a coagulation process is controlled and a membrane structure is made into a preferred one, a solvent in the solvent group 1 or, particularly, a latent solvent such as N-methyl-2-pyrrolidone or N,N-dimethylacetamide may be preferably added to a coagulation bath. In addition, polysaccharide, water-soluble polymer or the like may also be added in order to control a viscosity of a coagulation bath.

Temperature of a coagulation bath is not particularly limited but may be appropriately selected in view of controlling a pore size of a porous support membrane or in view of economy and safe operation. To be more specific, a range of from 0° C. to lower than 100° C. is preferred, and a range of from 10° C. to 80° C. is more preferred. When the temperature is lower than the above range, a viscosity of a coagulation bath becomes too high whereby a de-mixing process proceeds in a more retarded manner and, as a result, a membrane structure becomes dense and a water permeation property of the membrane tends to lower and, accordingly, it is not preferred. When the temperature is higher than the above range, the de-mixing process proceeds more instantly and, as a result, the membrane structure becomes rough and the membrane strength tends to lower and, accordingly, it is not preferred.

A time for immersing in a coagulation bath may be adjusted so that a structure of a porous support membrane is sufficiently produced due to a phase separation. In such a view that a coagulation is sufficiently advanced while steps therefor are not made uselessly long, the time is preferred to be within a range of from 0.1 to 1000 second(s). It is more preferred to be within a range of from 1 to 600 second(s).

After a porous support membrane is prepared by completing a membrane structure formation in a coagulation bath, it is preferred to be washed with water. There is no particular limitation for a washing method with water. A porous support membrane may be immersed in water for sufficient time or may be washed with running water for a predetermined period while being conveyed.

It is preferred that, after being washed with water, the porous support membrane is subjected to an after-treatment so that it becomes a preferred state for a step of making into a composite membrane which will be mentioned later. For example, a preferable after-treatment is a pore-filling treatment wherein a liquid such as alcohol, alkylene diol or triol, alkylene glycol alkyl ether or water or a mixed liquid thereof is impregnated with a porous support membrane to fill pores in the support membrane. As a result of the pore-filling treatment, it is possible to solve such a problem that, when a coating liquid is applied in a step of making into a composite state, SPAE molecules are excessively permeated into a porous support membrane so that a water permeation property lowers. Moreover or alternatively, the liquid used for the pore-filling treatment acts as a retaining agent for a pore size whereby a dry-shrinking of the porous support membrane can be suppressed and/or the porous support membrane which is hydrophobic can be kept in a hydrophilized state.

It is preferred that excessive water and solvent in the porous support membrane being subjected to the above pore-filling treatment are appropriately dried. Conditions for this drying should be appropriately adjusted so as to make properties as a composite separation membrane adequate. To be more specific, it is preferred to dry for about 0.01 second to one night at the temperature of 20 to 200° C.

The resulting porous support membrane is rolled by a winding apparatus, stored and, later, it may be taken out from a rolled state as a separate step and then subjected to a step for making into a composite. Alternatively, it may be subjected to a compositing step while being continuously conveyed without using a winding apparatus.

A thickness of a porous support membrane used for a composite separation membrane is preferred to be from 5 μm to 500 μm. When it is thinner than this range, a resistance to pressure may not be well secured while, when it is thicker than the range, a resistance to water permeation may become big. It is more preferred to be from 10 μm to 100 μm. In the case of a porous support membrane of a hollow fiber shape, an outer diameter of the membrane is preferred to be from 50 μm to 2000 μm. When it is smaller than this range, a fluid pressure loss of a permeation liquid or a supply liquid flowing in a bore side of the hollow becomes too big and thus an operation pressure may become too big. When it is bigger than the range, a resistance of the membrane to pressure may lower. It is more preferred to be from 80 μm to 1500 μm.

It is preferred that SPAE used for the first separation layer of the composite separation membrane of the present invention is prepared by a copolymerization of a combination of a hydrophilic monomer having a sulfonic group with a hydrophobic monomer having no sulfonic group. In this SPAE, it is possible to suitably select each of chemical structures for the hydrophilic monomer having a sulfonic group and for the hydrophobic monomer. To be more specific, when a chemical structure having a high rigidity is appropriately selected, a SPAE separation layer which is hardly swollen and is firm can be formed. Further, when a charging amount of each monomer is adjusted in a copolymerization reaction, an amount of sulfonic group introduced thereinto can be precisely controlled with a good reproducibility. As to another method for the production of SPAE, there is such a means wherein known polyarylene ether is sulfonated using sulfuric acid. However, this means is not preferred because a precise control of the introduction amount of sulfonic group is difficult and a decrease in a molecular weight is apt to happen during the reaction. As to the structure of SPAE prepared by a direct copolymerization, preferable one is such a structure wherein a fundamental structure is a polymer constituted from a repeating structure of a hydrophobic segment represented by the following formula (IV) having benzene rings connected with each other by ether bond and a hydrophilic segment represented by the following formula (V). This is because it expresses a rigid molecular structure and an excellent resistance to chemicals. Moreover, in the fundamental structure of the following formulae (IV) and (V), particularly in such a case wherein X, Y, Z and W are selected from the following combination, the whole molecular structure becomes more rigid, a polymer having a high glass transition temperature can be prepared and a good resistance to chemicals can be also maintained whereby it is preferred.

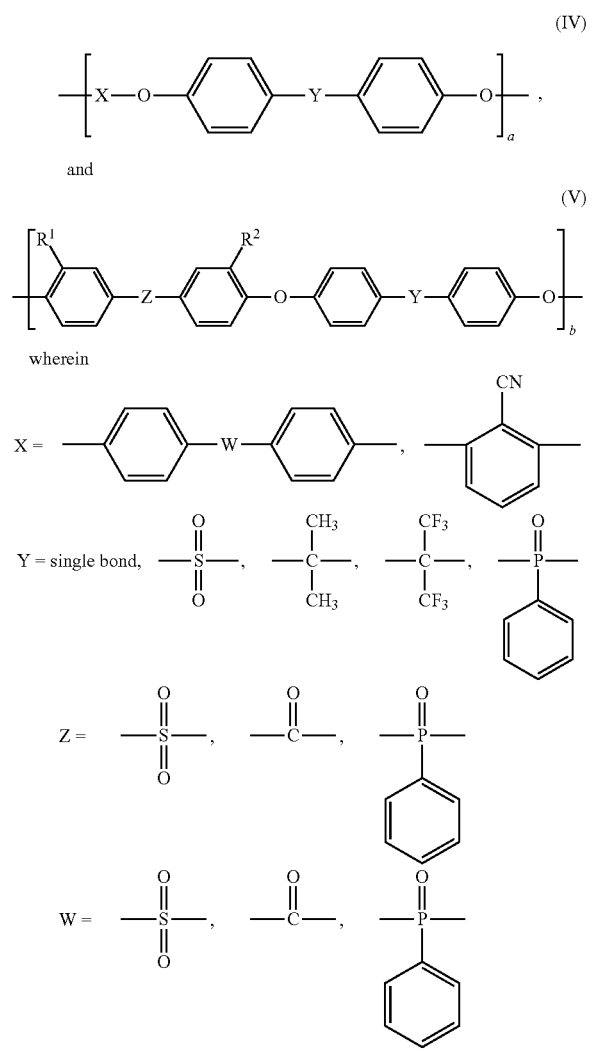

wherein Y and W are not selected as the same thing;

wherein a and b each represents a natural number of 1 or more;

wherein $R^1$ and $R^2$ each represents —$SO_3M$ or —$SO_3H$, wherein M represents a metal element; and wherein a sulfonation rate in terms of a percent rate of a repeating number of the formula (V) in the sulfonated polyarylene ether copolymer to a total of a repeating number of the formula (IV) and the repeating number of the formula (V) in the sulfonated polyarylene ether copolymer is more than 5% and less than 60%.

For a use as a composite separation membrane, a preferred ion exchange capacity (IEC; milli-equivalent of sulfonic group per 1 g of a sulfonated polymer) of the SPAE having the above chemical structure is 0.5 to 3.0 meq./g and a preferred range of a degree of sulfonation (DS) is more than 5% and less than 80%. When IEC and DS are lower than the above ranges, a number of the sulfonic group is too small whereby an anion charge density on a surface of the first separation layer becomes small. Therefore, there is such a tendency that steps for a formation of an adsorption layer via Coulomb's force of the second separation layer by an alternate layer-by-layer method which will be mentioned later do not proceed uniformly. Further, when IEC and DS are higher than the above ranges, a hydrophilicity of the polymer becomes too high whereby an SPAE separation layer may be excessively swollen. More preferred range for IEC is 0.7 to 2.9 meq./g and more preferred range for the sulfonating rate DS is from 10% to 70%.

It is more preferred that SPAE used for the first separation layer of the present invention is constituted from a repeating structure of a hydrophobic segment represented by the following formula (I) and a hydrophilic segment represented by the following formula (II):

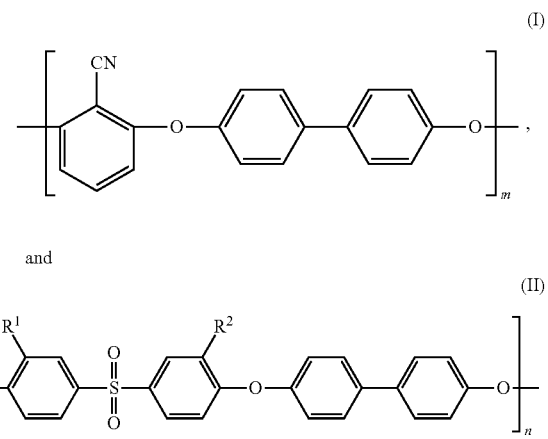

In the above formulae, m and n each represents a natural number of 1 or more; $R^1$ and $R^2$ each represents —$SO_3M$ or —$SO_3H$, wherein M represents a metal element; and a sulfonation rate in terms of a percent rate of a repeating number of the formula (II) in the sulfonated polyarylene ether copolymer to a total of a repeating number of the formula (I) and the repeating number of the formula (II) in the sulfonated polyarylene ether copolymer is more than 5% and less than 80%.

$R^1$ and $R^2$ each in the above formulae (II) and (V) stands for —$SO_3H$ or —$SO_3M$. A metal element M in the latter case is not particularly limited and preferred examples thereof include potassium, sodium, magnesium, aluminum and cesium. More preferred examples of the metal element M include potassium and sodium.

A number-average molecular weight of SPAE represented by the above formulae (I) and (II) as well as (IV) and (V) is preferred to be 1,000 to 1,000,000 in such a view that a viscosity of a coating solution is made adequate and that a thin film having a sufficient separation property and mechanical strength as a separation layer is formed.

In the SPAE represented by the above formulae (I) and (II) as well as (IV) and (V), a rigidity of its molecular structure is high whereby it is possible to form a separation layer having a high mechanical strength and being hardly swollen. Accordingly, it is excellent as a composite separation membrane. Further, since the SPAE represented by the above formulae (I) and (II) contains a benzonitrile structure in a hydrophobic segment represented by the formula (I), it has an excellent resistance to chemicals and a cohesive force of the hydrophobic part thereof becomes strong, leading to a formation of a separation layer wherein a hydrophilic domain is supported by a firm hydrophobic matrix. As a result, there is achieved a characteristic that a swelling of a separation layer is suppressed.

As to a coating solvent for the above SPAE, the preferred one is a solvent containing at least one component selected from dimethyl sulfoxide, N,N-dimethylacetamide, N,N-dimethylformamide, N-methyl-2-pyrrolidone and γ-butyrolactone which are aprotic polar solvents of the solvent group 1. Further, among the solvents of the solvent group 1, dimethyl sulfoxide and γ-butyrolactone are more preferred since they do not dissolve the above-mentioned polyphenylene ether porous support membrane even at a high temperature. In addition, a solvent prepared by mixing dimethyl sulfoxide or γ-butyrolactone with any of N,N-dimethylacetamide, N,N-dimethylformamide and N-methyl-2-pyrrolidone may be preferably used as well. Moreover, a structure of a separation layer in a composite separation membrane may be controlled by such means that a solvent having an inferior solubility or a solvent having a different vapor pressure is added to the solvents of the solvent group 1 to modify an evaporation rate of a coating solution and/or to modify a stability of a solution. For example, a solvent such as lower carboxylic acid (e.g. formic acid), alcohol, alkylene diol or triol and alkylene glycol alkyl ether (hereinafter, they will be referred to as a solvent group 2) may be contained in the solvents of the solvent group 1.

It is also possible to add known hydrophilic polymers such as polyethylene glycol and polyvinylpyrrolidone thereto in order to modify a viscosity and a hydrophilicity of a coating solution of SPAE. The use of such additives should be conducted as a means within a usual range for making properties of a composite separation membrane adequate by such a manner that, in a coating step, a coating solution just in an appropriate amount is applied on a surface of a porous support membrane and/or that a membrane structure of a composite separation membrane is controlled.

A concentration of the SPAE in a coating solution is not particularly limited but should be appropriately adjusted in order to control a thickness of the first separation layer in the composite separation membrane. Although the final thickness of the first separation layer may be affected, for example, by an applying speed of a coating solution on a surface of a porous support membrane and by a temperature at that time, the concentration of the SPAE is preferred to be 0.01 to 20% by mass and more preferred to be 0.1 to 10% by mass. When the concentration of the SPAE is smaller than this range, the thickness of the first separation layer is too thin and defects are apt to happen whereby it is not preferred. When it is larger than this range, the thickness of the first separation layer may be too large and a resistance to a filtering may become big. Accordingly, a sufficient water permeation property as a composite separation membrane may not be achieved The final thickness of the first separation layer by SPAE is preferred to be 50 nm to 1 μm and more preferred to be 50 nm to 500 nm.

There is no particular limitation for a method of applying the above-mentioned coating solution on a surface of a porous support membrane but known means may be used. For example, in the case of a flat sheet membrane, a simple method wherein a coating solution is applied on the surface of the porous support membrane using a brush by hand is preferred. As to a more industrial method, it is preferred to use a method wherein a coating solution is applied by a slide bead coater on the surface of the porous support membrane which is continuously conveyed. In the case of a hollow fiber membrane, it is preferred to use a dip-coating method wherein a hollow fiber membrane being continuously conveyed is dipped in a bath filed with a coating solution and then pulled out so as to apply the solution onto an outer surface of the hollow fiber membrane. Alternatively, it is also preferred to use a method wherein a coating solution is inserted into a hollow fiber membrane from an end side of a module prepared by bundling the hollow fiber membrane and then the coating solution is extruded using gas or it is pulled out in vacuo from other side of the module so as to apply the coating solution onto an inner surface of the hollow fiber membrane.

A coating solution applied onto a surface of a porous support membrane is subjected to a drying treatment whereby thin film of SPAE is formed. Although there is no particular limitation for a drying method, there may be used, for example, a method wherein a porous support membrane subjected to a coating treatment is passed for predetermined time into a drying furnace subjected to a compulsory convection. Alternatively, a drying may be also carried out by heating using an infrared ray. A drying temperature, a drying time or an aeration rate in a drying furnace subjected to a compulsory convection are conditions which are to be appropriately adjusted in order to make properties of the composite separation membrane specific and desired values. Thus, they may be appropriately adjusted so that the solvent is quickly dried, that the porous support membrane is not deteriorated due to an excessively high temperature and that a composite separation membrane having an excellent separating ability is achieved.

In the SPAE composite separation membrane prepared as such, a known alternate layer-by-layer method is applied onto the surface of the SPAE separation layer which is the first separation layer whereupon a second separation layer is formed. To be more specific, an aqueous solution of an ionomer containing a cationic functional group is contacted with a surface of the first separation layer comprising SPAE which is anionic whereupon an adsorption layer is formed via a Coulomb's force acting on an area between an anionic functional group (sulfonic group) of SPAE and a cationic functional group of ionomer.

After that, it is preferred that an aqueous solution of an ionomer containing an anionic functional group is contacted therewith whereby an anionic adsorption layer can be formed on a surface of the above adsorption layer of the ionomer containing the cationic functional group.

When the contact as such with the aqueous solution of the ionomer containing the positive ionic functional group and with the aqueous solution of the ionomer containing the negative ionic functional group is repeated for arbitrary times so as to grow a thickness of the adsorption layer, a very thin second separation layer can be formed.

A number of the layer in the alternate layer-by-layer method is preferred to be from one layer to 20 layers. It is more preferred to be from 2 layers to 10 layers. When the layer number is too many, a thickness of the second separation layer may become too large and a water permeability may lower.

A thickness of the second separation layer is preferred to be from 1 nm to less than 50 nm. When it is 50 nm or more, a water permeability may not be sufficient. When it is less than 1 nm, defects may be resulted. It is more preferred to be from 5 nm to 30 nm.

It is preferred that the SPAE layer of the first separation layer as a starting point for forming the second separation by an alternate layer-by-layer method has a high water permeability and a high charge density. IEC of the SPAE of the first separation layer is preferably from 0.5 to 4.0 meq./g, and more preferably from 1.0 to 3.0 meq./g. When IEC is smaller than this range, a water permeability may become small and, moreover, a charged amount on a surface of the first separation layer may become small and an adsorbed amount of the ionomer may become small. When IEC is larger than this range, the first separation layer may be too much swollen with water whereby a mechanical strength may become lower than a level for a practical use.

It is preferred that an aqueous solution of aldehyde is contacted with the second separation layer during and/or after the above formation of the second separation layer whereby an ionomer having a functional group being reactive to the aldehyde is subjected to a cross-linking treatment. As a result of the cross-linking treatment, the second separation layer becomes dense whereby it is now possible to inhibit neutral low molecules more highly. Examples of the functional group being reactive to aldehyde are primary to tertiary amino groups and hydroxyl group. An ionomer containing such a functional group may be listed as an object for the cross-linking treatment.

Although there is no particular limitation for a chemical structure of an ionomer constituting the second separation layer of the present invention, polymers containing primary to tertiary amino groups, quaternary ammonium group, phosphonium group and sulfonium group may be exemplified as ionomers containing a cationic functional group. Preferred examples are the polymers containing primary to tertiary amino groups and quaternary ammonium group which can be relatively easily prepared. To be more specific, polyethyleneimine, polyallylamine, etc. may be used. More preferably, polymers having a quaternary ammonium group may be used in view of their excellent resistance to an exposure to chlorine. To be more specific, modified polyvinyl alcohol having polydiallyldimethylammonium or quaternary ammonium group may be advantageously used.

As to an ionomer containing an anionic functional group, polymers having sulfonic group, phosphonic acid group, carboxyl group, etc. may be used. Preferably, in view of easiness in preparation and availability, polymers having sulfonic group or carboxyl group may be used. To be more specific, modified polyvinyl alcohol having polystyrene sulfonic acid, sulfonic group or carboxyl group may be advantageously used.

The ionomers as such may also be in a form of a salt wherein various counter ions are bonded to an ionic functional group. To be more specific, halide ion such as chloride ion may be bonded to a cationic functional group and alkali metal ion such as potassium ion or sodium ion may be bonded to an anionic functional group. Counter ions other than the exemplified ones may also be bonded.

In such a view that a cross-linking treatment by aldehyde is conducted so as to enhance an inhibition property of the second separation layer against neutral low molecules, polyallylamine or polyethyleneimine having the above primary to tertiary amine groups and modified polyvinyl alcohol having quaternary ammonium group, sulfonic group, carboxyl group or the like may also used preferably. The amino groups and hydroxyl group contained in the above ionomer are advantageous since they react with aldehyde relatively easily. More preferably, it is preferred to use modified polyvinyl alcohol having an anionic or cationic functional group having hydroxyl group, due to its excellent resistance to acid, alkali and chlorine.

As to the aldehyde used for the cross-linking treatment, there may be preferably used formaldehyde, glutaraldehyde, glyoxal, benzaldehyde, orthophthalaldehyde, isophthalaldehyde, terephthalaldehyde, etc. More preferably, glutaraldehyde may be used in view of its high water solubility, relatively low toxicity and good property of the separation membrane after the cross-linking treatment.

In view of promoting the cross-linking reaction in the above-mentioned cross-linking treatment, an acid catalyst may be preferably added to an aqueous solution of aldehyde. To be more specific, hydrochloric acid, phosphoric acid, nitric acid, sulfuric acid, citric acid or the like may be used. In view of no volatility and easy handling, it is more preferred to use sulfuric acid. A pH preferred for a sufficient promotion of the cross-linking reaction is 4 or less, and it is more preferred to be 2 or less.

In an alternate layer-by-layer method, appropriate conditions within the consideration of those skilled in the art is to be selected for a polymer concentration, a temperature, a contacting time with the first separation layer, an ion concentration and a contacting method of an aqueous solution of an ionomer. The concentration of the polymer in the aqueous solution of the ionomer is preferred to be from 0.01 to 1% by mass. When it is too low, an adsorption layer of polymer may not be formed while, when it is too high, the adsorption layer may become too thick. The temperature of the aqueous solution of ionomer is preferred to be from 10 to 60° C. When it is too low, an adsorption rate may become slow while, when it is too high, the composite separation membrane may be swollen. The contacting time with the first separation layer is preferred to be from 10 seconds to 24 hours. When the contacting time is too short, the adsorption layer may not be sufficiently formed while, when it is too long, the adsorption layer may become too thick or wasteful time may be resulted in production steps. The adsorption rate or adsorption amount of the polymer can be appropriately adjusted by adding an inorganic salt such as NaCl to the aqueous solution of the ionomer. The concentration of the ion is preferred to be from 0 to 3 mol/L. When the ion concentration is too high, the polymer may be separated out. There is no particular limitation for the method of contacting the first separation layer with the aqueous solution of the ionomer. Thus, there may be used such a method wherein a composite separation membrane conveyed on a roll is dipped in a tank filled with the aqueous solution of the ionomer or there may be used such a method wherein the composite separation membrane is made into a module and then the first separation layer is contacted with the aqueous solution of the ionomer. In the case of contacting the aqueous solutions of various ionomers with the first separation layer in an alternate manner, it is preferred to rinse a surface of the first separation layer with water so as to remove an excessive ionomer other than the adsorbed one.

Specific characteristic features of the composite separation membrane according to the present invention will be mentioned as follows. The first separation layer formed by the selected SPAE is excellent in a mechanical strength and is strongly bonded to the porous support membrane. Accordingly, it exhibits excellent physical and chemical resistances as the composite separation membrane.

A surface of this first separation layer is flat and smooth and has a high anion charge density. When such a surface is used as a starting point in the alternate layer-by-layer method, a formation of an adsorption layer of an ionomer via Coulomb's force now proceeds very smoothly as well as uniformly. Therefore, even when a total thickness of the adsorption layer is as very thin as less than 50 nm, it is now possible to obtain the second separation layer without any deficiency and having a high fractionating property.

The characteristic feature in the production method according to the present invention is that the alternate layer-by-layer steps for the second separation layer by the ionomer and the cross-linking steps of the second separation layer by the aldehyde are always carried out in a liquid phase. Since there is no drying step therein, a shrinking of the membrane structure due to the drying is not resulted and, during the process for forming the second separation layer, no severe defect such as cracks and pinholes is resulted. Further, in the cross-linking step, a shrinking stress in the second separation layer caused by the cross-linking can be absorbed by the first separation layer comprising SPAE in a hydrated and softened state which acts as a buffer layer. Therefore, in accordance with the method for producing the composite separation membrane of the present invention, it is now possible without any deficiency to form the very thin second separation layer of less than 50 nm which has been substantially impossible to prepare in a conventional method wherein a polymer is applied and then dried.

EXAMPLES

Example 1

Preparation of Porous Support Membrane

As a polymer for a porous support membrane, Polyphenylene Ether PX100L (hereinafter, abbreviated as PPE) manufactured by Mitsubishi Engineering Plastic KK was provided. N-Methyl-2-pyrrolidone (hereinafter, abbreviated as NMP) was added thereto so as to make PPE content 20% by mass. The resulting mixture was dissolved at 130° C. with kneading to give a homogeneous dope for membrane preparation.

After that, the dope for membrane preparation was extruded from a double cylindrical nozzle into a hollow shape. At the same time, a 35% by mass aqueous solution of NMP was extruded as an inner liquid. The resulting one was made to run in air of an ordinary room temperature for a drying treatment, and then immersed in a coagulation bath of 40° C. filled with a 30% by mass aqueous solution of NMP. The resulting PPE porous support membrane was subjected to a washing treatment with water.

An outer diameter and a membrane thickness of the resulting PPE porous support membrane were 260 μm and 50 μm, respectively. As a result of a pure water permeability test, a permeation flow rate FR of pure water was 10,000 L/m²/day under a test pressure of 0.5 MPa.

Preparation of Composite Separation Membrane

SPAE having a repeating structure of a hydrophobic segment represented by the above formula (I) and a hydrophilic segment represented by the above formula (II) was prepared as follows.

Disodium salt of 3,3'-disulfo-4,4'-dichlorodiphenyl sulfone (hereinafter, it will be abbreviated as S-DCDPS) (30.000 g) and 2,6-dichlorobenzonitrile (hereinafter, it will be abbreviated as DCBN) (17.036 g) were weighed and taken so that a charging molar ratio of S-DCDPS to DCBN was made 38:62. Then, 4,4'-biphenol (29.677 g), potassium carbonate (24.213 g) and molecular sieve were further weighed and taken into a four-neck flask and nitrogen was flown thereinto. NMP (259 g) was added thereto, the resulting mixture was stirred at 150° C. for 50 minutes and, after that, the reaction was continued under such a yardstick that a viscosity of a system sufficiently rose by raising a reaction temperature up to 195 to 200° C. After that, the system was allowed to cool and then precipitated into water after removing the sedimented molecular sieve. The resulting polymer was washed for one hour in boiling water. It was then carefully washed with pure water so that the remaining potassium carbonate was completely removed. After that, the polymer was dried to give SPAE which was an aimed product having a sulfonating degree (DS) of 38%. It was found that sulfonic group was almost neutralized with potassium.

A DMSO solvent was added to the resulting SPAE. The resulting mixture was stirred at an ordinary room temperature and dissolved to give a coating solution of 1% by mass concentration.

A porous support membrane of PPE was subjected to a dip coating in the coating solution of SPAE and dried in a vertical drying furnace at 120° C. After that, a composite separation membrane having a first separation layer consisting of SPAE was wound to a winder.

Further, an alternate layer-by-layer treatment was conducted for the above composite separation membrane. To be more specific, the above composite separation membrane was dipped into a 0.1% by mass aqueous solution of K434 manufactured by Nippon Synthetic Chemical Industry (which was a cationic polyvinyl alcohol modified by quaternary ammonium group (hereinafter, it will be abbreviated as CPVA)), so that the CPVA was adsorbed with a surface of the first separation layer for 30 minutes. After that, the composite separation membrane was washed with pure water and then dipped into a 0.1% by mass aqueous solution of CKS 50 manufactured by Nippon Synthetic Chemical Industry (which was an anionic polyvinyl alcohol modified with a sulfonic group (hereinafter, it will be abbreviated as APVA)), so as to conduct an adsorbing treatment of APVA for 30 minutes followed by washing with water similarly. After the above layering treatment for two layers, the composite separation membrane was dipped into a 1% by mass aqueous solution of glutaraldehyde (hereinafter, it will be abbreviated as GA), so as to conduct a cross-linking treatment. After that, the composite separation membrane was well washed. After that, the alternate layer-by-layer treatment of CPVA and APVA and the cross-linking treatment with an aqueous solution of GA were repeated once again under the entirely same conditions (alternately-layered number was 4). As such, a composite separation membrane having a first separation layer and a second separation layer was prepared. Details and the evaluated results of the resulting composite separation membrane are shown in Table 1.

Example 2

Preparation of Porous Support Membrane

A porous support membrane of PPE was prepared by the entirely same method as in Example 1 except that the concentration, of PPE as a polymer for the porous support membrane was made 30% by mass. The outer diameter was 260 μm and the membrane thickness was 45 μm. When the pure water permeability test was conducted, the permeation flow rate FR of pure water was 5,900 L/m²/day under a test pressure of 0.5 MPa.

Preparation of Composite Separation Membrane

A composite separation membrane having a first separation layer and a second separation layer was prepared by the entirely same method as in Example 1 except that a porous support membrane was changed. Details and the evaluated results of the resulting composite separation membrane are shown in Table 1.

Example 3

Preparation of Porous Support Membrane

A porous support membrane of PPE was prepared by the same method as in Example 1.

Preparation of Composite Separation Membrane

SPAE having DS of 44% was prepared by a method similar to Example 1 except that the molar ratio of charging amounts of S-DCDPS to DCBN was changed to 44:56.

A composite separation membrane having a first separation layer and a second separation layer was prepared by the entirely same method as in Example 1 except that DS of SPAE of the first separation layer was changed. Details and the evaluated results of the resulting composite separation membrane are shown in Table 1.

Example 4

Preparation of Porous Support Membrane

A porous support membrane of PPE was prepared by the same method as in Example 1.

Preparation of Composite Separation Membrane

A composite separation membrane having a first separation layer was prepared by the same method as in Example 1.

Further, the composite separation membrane was dipped into a 0.1% by mass aqueous solution of CPVA (K434 manufactured by Nippon Synthetic Chemical Industry) so that CPVA was adsorbed with a surface of the first separation layer for 30 minutes. After that, the composite separation membrane was washed with pure water and then the membrane was dipped into a 0.1% by mass aqueous solution of APVA (T300H manufactured by Nippon Synthetic Chemical Industry) modified with carboxyl group so as to conduct an adsorption treatment of APVA for 30 minutes followed by washing with water similarly. After the above layering treatment for two layers, the composite separation membrane was dipped into a 1% by mass aqueous solution of GA so as to conduct a cross-linking treatment. After that, the composite separation membrane was well washed (alternately-layered number was 2). As such, a composite separation membrane having the first separation layer and a second separation layer was prepared. Details and the evaluated results of the resulting composite separation membrane are shown in Table 1.

Example 5

Preparation of Porous Support Membrane

A porous support membrane of PPE was prepared by the same method as in Example 1.

Preparation of Composite Separation Membrane

SPAE having DS of 65% was prepared by a method similar to Example 1 except that the molar ratio of charging amounts of S-DCDPS to DCBN was changed to 65:35, and a composite separation membrane having a first separation layer was prepared.

Further, the composite separation membrane was dipped into a 0.1% by mass aqueous solution of CPVA (K434 manufactured by Nippon Synthetic Chemical Industry) so that CPVA was adsorbed with a surface of the first separation layer for 30 minutes. After that, the composite separation membrane was washed with pure water and then the membrane was dipped into a 0.1% by mass aqueous solution of APVA (CK550 manufactured by Nippon Synthetic Chemical Industry) so as to conduct an adsorption treatment of APVA for 30 minutes followed by washing with water similarly. After that, the composite separation membrane was dipped into a 0.1% by mass aqueous solution of CPVA (K434 manufactured by Nippon Synthetic Chemical Industry) so that CPVA was adsorbed with the surface of the first separation layer for 30 minutes. Finally, the composite separation membrane was dipped into a 1% by mass aqueous solution of GA so as to conduct a cross-linking treatment. After that, the composite separation membrane was well washed (alternately-layered number was 3). As such, a composite separation membrane having the first separation layer and a second separation layer was prepared. Details and the evaluated results of the resulting composite separation membrane are shown in Table 1.

Example 6

Preparation of Porous Support Membrane

A porous support membrane of PPE was prepared by the same method as in Example 1.

Preparation of Composite Separation Membrane

Selection was done from a combination of the above formulae (IV) and (V). SPAE having a repeated structure of a hydrophobic segment represented by the following formula (VI) and a hydrophilic segment represented by the following formula (VII) was arranged as shown below.

Disodium salt of 3,3'-disulfo-4,4'-dichlorodiphenyl sulfone (hereinafter, it will be abbreviated as S-DCDPS) (30.000 g) and 4,4'-dichlorodiphenylsulfone (hereinafter, it will be abbreviated as DCDPS) (70.936 g) were weighed and taken so that a charging molar ratio of S-DCDPS to DCDPS was made 20:80. Then, 4,4'-biphenol (56.386 g), potassium carbonate (46.004 g) and molecular sieve were further weighed and taken into a four-neck flask and nitrogen was flown thereinto. NMP (534 g) was added thereto, the resulting mixture was stirred at 150° C. for 50 minutes and, after that, the reaction was continued under such a yardstick that a viscosity of a system sufficiently rose by raising the reaction temperature up to 195 to 200° C. After that, the system was allowed to cool and then precipitated into water after removing the sedimented molecular sieve. The resulting polymer was washed for one hour in boiling water. It was then carefully washed with pure water so that the remaining potassium carbonate was completely removed. After that, the polymer was dried to give SPAE which was an aimed product having a sulfonating degree DS of 20%. It was found that sulfonic group was almost neutralized with potassium.

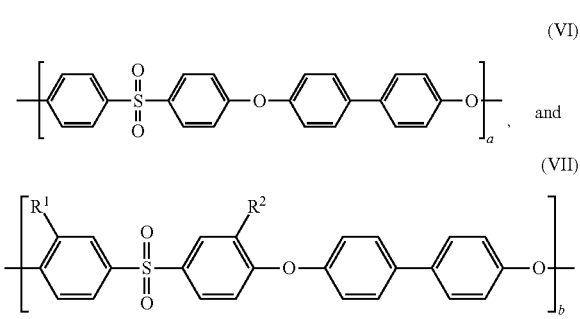

In the above formulae, the symbols represented by a and b and by $R^1$ and $R^2$ have the same meanings as those stipulated in the already-mentioned formulae (IV) and (V).

A composite separation membrane having a first separation layer and a second separation layer was prepared by the entirely same method as in Example 1 except that a different SPAE structure was used as the first separation layer. Details and the evaluated results of the resulting composite separation membrane are shown in Table 1.

Example 7

Preparation of Porous Support Membrane

A porous support membrane of PPE was prepared by the same method as in Example 1.

Preparation of Composite Separation Membrane

SPAE having DS of 20% was prepared by a method similar to Example 1 except that the molar ratio of charging amounts of S-DCDPS to DCBN was changed to 20:80.

A composite separation membrane having a first separation layer and a second separation layer was prepared by the entirely same method as in Example 1 except that DS of SPAE of the first separation layer was changed. Details and the evaluated results of the resulting composite separation membrane are shown in Table 1.

Example 8

Preparation of Porous Support Membrane

A porous support membrane of PPE was prepared by the same method as in Example 1.

Preparation of Composite Separation Membrane

A composite separation membrane having a first separation layer was prepared by the entirely same method as in Example 1.

Further, the composite separation membrane was dipped into a 0.1% by mass aqueous solution of CPVA (K434 manufactured by Nippon Synthetic Chemical Industry) so that CPVA was adsorbed with a surface of the first separation layer for 30 minutes. After that, the composite separation membrane was washed with pure water and then the membrane was dipped into a 0.1% by mass aqueous solution of APVA (CKS50 manufactured by Nippon Synthetic Chemical Industry) so as to conduct an adsorption treatment of APVA for 30 minutes followed by washing with water similarly. The above layering treatment for two layers was repeated for four times. Finally, the composite separation membrane was dipped into a 1% by mass aqueous solution of GA so as to conduct a cross-linking treatment. After that, the composite separation membrane was well washed (alternately-layered number was 8). As such, a composite separation membrane having the first separation layer and a second separation layer was prepared. Details and the evaluated results of the resulting composite separation membrane are shown in Table 1.

Example 9

Preparation of Porous Support Membrane

A porous support membrane of PPE was prepared by the same method as in Example 1.

Preparation of Composite Separation Membrane

A composite separation membrane having a first separation layer was prepared by the entirely same method as in Example 1.

Further, a second separation layer was prepared on the first separation layer by the entirely same method as in Example 1 except that a cross-linking agent was changed to a 1% by mass aqueous solution of orthophthalaldehyde (abbreviated as OPA). As such, a composite separation membrane having the first separation layer and the second separation layer was prepared. Details and the evaluated results of the resulting composite separation membrane are shown in Table 1.

Example 10

Preparation of Porous Support Membrane

A porous support membrane of PPE was prepared by the same method as in Example 1.

Preparation of Composite Separation Membrane

A composite separation membrane having a first separation layer was prepared by the entirely same method as in Example 1.

Further, a second separation layer was prepared on the first separation layer by the entirely same method as in Example 1 except that a cross-linking agent was changed to a 0.1% by mass aqueous solution of terephthalaldehyde (abbreviated as TPA). As such, a composite membrane separation having the first separation layer and the second separation layer was prepared. Details and the evaluated results of the resulting composite separation membrane are shown in Table 1.

Example 11

Preparation of Porous Support Membrane

As a polymer for a porous support membrane, PX 100 L (polyphenylene ether (hereinafter, it will be abbreviated as PPE) manufactured by Mitsubishi Engineering Plastics) was provided as same as in Example 1. N-Methyl-2-pyrrolidone (hereinafter, it will be abbreviated as NMP) was added thereto so as to make PPE content 15% by mass and dissolved at 130° C. together with kneading to give a uniform dope for membrane preparation.

After that, paper prepared from polyester (05TH-60 manufactured by Hirose Seishi) wherein an aqueous solution of glycerol was appropriately impregnated therewith was placed on a warmed glass substrate plate. The dope kept at 100° C. was uniformly applied thereon using a hand coater. This was dipped into a coagulation bath of 20° C. to prepare a flat and filmy porous support membrane. After that, a treatment of washing with water was conducted.

Preparation of Composite Separation Membrane

SPAE having DS of 38% was prepared by the same method as in Example 1.

A DMSO solvent was added to the resulting SPAE and dissolved by stirring at an ordinary room temperature to prepare a 1.0% by mass coating solution. Making into a composite membrane was conducted by using a hand coater onto a surface of the flat and filmy PPE porous support membrane in 30 cm square. Drying by hot air was conducted at 80° C. for 30 minutes. As such, a flat and filmy composite separation membrane having a first separation layer consisting of SPAE was prepared.

Further, the flat and filmy composite separation membrane was subjected to an alternate layer-by-layer treatment by entirely the same method as in Example 1 whereupon a second separation layer was prepared on the first separation layer. As such, a flat and filmy composite separation membrane having the first separation layer and the second separation layer was prepared. Details and the evaluated results of the resulting composite separation membrane are shown in Table 1.

Example 12

Preparation of Porous Support Membrane

A porous support membrane of PPE was prepared by the same method as in Example 1.

Preparation of Composite Separation Membrane

A composite separation membrane having a first separation layer was prepared by the entirely same method as in Example 1.

Further, the composite separation membrane was dipped into a 0.02% by mass aqueous solution of cationic polyethyleneimine (abbreviated as PEI; manufactured by Wako Pure Chemical Industries, Ltd.) so that PEI was adsorbed with a surface of the first separation layer for 30 minutes. After that, the composite separation membrane was washed with pure water and then dipped into a 0.1% by mass aqueous solution of APVA (CKS50 manufactured by Nippon Synthetic Chemical Industry) so as to conduct an adsorbing treatment of APVA for 30 minutes followed by washing with water similarly. After the above layering treatment for two layers, the composite separation membrane was dipped into a 1% by mass aqueous solution of glutaraldehyde (hereinafter, it will be abbreviated as GA) so as to conduct a cross-linking treatment. After that, the composite separation membrane was well washed. After that, the alternate layer-by-layer treatment of PEI and APVA and the cross-linking treatment with an aqueous solution of GA were repeated once again under the entirely same conditions (alternately-layered number was 4). As such, a composite separation membrane having the first separation layer and a second separation layer was prepared. Details and the evaluated results of the resulting composite separation membrane are shown in Table 1.

Example 13

Preparation of Porous Support Membrane

A porous support membrane of PPE was prepared by the same method as in Example 1.

Preparation of Composite Separation Membrane

A composite separation membrane having a first separation layer was prepared by the entirely same method as in Example 1.

Further, the composite separation membrane was dipped into a 0.03% by mass aqueous solution of cationic polyallylamine hydrochloride (abbreviated as PAA; PAA-HCL-3L manufactured by NITTOBO MEDICAL CO., LTD.,) so that PAA was adsorbed with a surface of the first separation layer for 30 minutes. After that, the composite separation membrane was washed with pure water and then the membrane was dipped into a 0.1% by mass aqueous solution of APVA (CKS50 manufactured by Nippon Synthetic Chemical Industry) so as to conduct an adsorption treatment of APVA for 30 minutes followed by washing with water similarly. After the above layering treatment for two layers, the composite separation membrane was dipped into a 1% by mass aqueous solution of glutaraldehyde (hereinafter, it will be abbreviated as GA) so as to conduct a cross-linking treatment. After that, the composite separation membrane was well washed. After that, the alternate layer-by-layer treatment of PAA and APVA and the cross-linking treatment with an aqueous solution of GA were repeated once again under the entirely same conditions (alternately-layered number was 4). As such, a composite separation membrane having the first separation layer and a second separation layer was prepared. Details and the evaluated results of the resulting composite separation membrane are shown in Table 1.

Example 14

Preparation of Porous Support Membrane

A porous support membrane of PPE was prepared by the same method as in Example 1.

Preparation of Composite Separation Membrane

A composite separation membrane having a first separation layer was prepared by the entirely same method as in Example 1.

Further, the composite separation membrane was dipped into a 0.03% by mass aqueous solution of cationic polydiallyldimethylammonium hydrochloride (abbreviated as PDADMA; manufactured by Sigma-Aldrich) so that PDADMA was adsorbed with a surface of the first separation, layer for 30 minutes. After that, the composite separation membrane was washed with pure water and then the membrane was dipped, into a 0.1% by mass aqueous solution of APVA (CKS50 manufactured by Nippon Synthetic Chemical Industry) so as to conduct an adsorption treatment of APVA for 30 minutes followed by washing with water similarly. After the above layering treatment for two layers, the composite separation membrane was dipped into a 1% by mass aqueous solution of glutaraldehyde (hereinafter, it will be abbreviated as GA) so as to conduct a cross-linking treatment. After that, the composite separation membrane was well washed. After that, the alternate layer-by-layer treatment of PDADMA and APVA and the cross-linking treatment with an aqueous solution of GA were repeated once again under the entirely same conditions (alternately-layered number was 4). As such, a composite separation membrane having the first separation layer and a second separation layer was prepared. Details and the evaluated results of the resulting composite separation membrane are shown in Table 1.

Example 15

Preparation of Porous Support Membrane

A porous support membrane of PPE was prepared by the same method as in Example 1.

Preparation of Composite Separation Membrane

A composite separation membrane having a first separation layer was prepared by the entirely same method as in Example 1.

Further, the composite separation membrane was dipped into a 0.1% by mass aqueous solution of CPVA (K434 manufactured by Nippon Synthetic Chemical Industry) so that CPVA was adsorbed with a surface of the first separation layer for 30 minutes. After that, the composite separation membrane was washed with pure water and then the membrane was dipped into a 0.03% by mass aqueous solution of polystyrene sulfonic acid sodium (abbreviated as PSS; 243051 manufactured by Sigma-Aldrich) so as to conduct an adsorption treatment of APVA for 30 minutes followed by washing with water similarly. After the above layering treatment for two layers, the composite separation membrane was dipped into a 1% by mass aqueous solution of glutaraldehyde (hereinafter, it will be abbreviated as GA) so as to conduct a cross-linking treatment. After that, the composite separation membrane was well washed. After that, the alternate layer-by-layer treatment of CPVA and PSS and the cross-linking treatment with an aqueous solution of GA were repeated once again under the entirely same conditions (alternately-layered number was 4). As such, a composite separation membrane having the first separation layer and a second separation layer was prepared. Details and the evaluated results of the resulting composite separation membrane are shown in Table 1.

Comparative Example 1

Preparation of Porous Support Membrane

A porous support membrane of PPE was prepared by the same method as in Example 1.

Preparation of Composite Separation Membrane

SPAE having DS of 38% was prepared by the same method as in Example 1.
A composite separation membrane having a first separation layer was prepared by the same method as in Example 1.

For the sake of comparison, no alternate layer-by-layer treatment was conducted and no second separation layer was formed. Thus, a composite separation membrane having only the first separation layer was prepared. Details and evaluation results of the resulting composite separation membrane are shown in Table 1. As compared with the product of Examples, it was clear that the composite separation membrane of Comparative Example 1 was inferior in a water permeability and in an inhibition rate against neutral low molecules (sucrose and glucose).

Comparative Example 2

Preparation of Porous Support Membrane

A porous support membrane of PPE was prepared by the same method as in Example 1.

Preparation of Composite Separation Membrane

SPAE having DS of 20% was prepared by a method similar to Example 1 except that the molar ratio of charging amounts of S-DCDPS to DCBN was changed.
A composite separation membrane having a first separation layer was prepared by the same method as in Example 1 except that the temperature of the vertical drying furnace was changed to 160° C.

For the sake of comparison, no alternate layer-by-layer treatment was conducted and no second separation layer was formed. Thus, a composite separation membrane having only the first separation layer was prepared. Details and evaluation results of the resulting composite separation membrane are shown in Table 1. As compared with the product of Examples, it was clear that the composite separationmembrane of Comparative Example 2 was inferior in a water permeability and in an inhibition rate against neutral low molecules (sucrose and glucose).

Comparative Example 3

Preparation of Porous Support Membrane

A porous support membrane of PPE was prepared by the same method as in Example 1.

Preparation of Composite Separation Membrane

SPAE having DS of 38% was prepared by the same method as in Example 1.
A composite separation membrane having a first separation layer was prepared by the same method as in Example 1.

Further, for the sake of comparison with an alternate layer-by-layer method, it was investigated to form a second separation layer by means of an application/drying method to the composite separation membrane having the first separation layer. To be more specific, the composite separation membrane subjected to roll conveyance was dipped into a tank filed with a 0.8% by mass aqueous solution of CPVA (K434 manufactured by Nippon Synthetic Chemical Industry) and pulled out so as to dip-coat followed by drying at 80° C. for 1 minute using a vertical drying furnace. After that, it was dipped into a tank filled with a 0.8% by mass aqueous solution of APVA (CKS50 manufactured by Nippon Synthetic Chemical Industry) and pulled out so as to dip-coat followed by drying at 80° C. for 1 minute using the vertical drying furnace. After that, the composite separation membrane wound to a winder was dipped in a 1% by mass aqueous solution of glutaraldehyde so as to conduct a cross-linking treatment. After the composite separation membrane was well washed with water, it was subjected to a moistening treatment by alcohol. After that, the membrane was completely substituted with pure water. As such, a composite separation membrane having the first separation layer and a second separation layer was prepared. Details and the evaluated results of the resulting composite separation membrane are shown in Table 1. When the composite separation membrane of Comparative Example 3 was compared with those of Examples, the second separation layer was thick and, moreover, it was apt to result in deficiency in the production process particularly in the drying step. Therefore, it was clear that the composite separation membrane of Comparative Example 3 was inferior in a water permeability and in an inhibition rate against neutral low molecules (sucrose and glucose).

Comparative Example 4

Preparation of Asymmetric Hollow Fiber Membrane

An asymmetric hollow fiber membrane was prepared using SPAE having a repeated structure of a hydrophobic segment represented by the above formula (I) and a hydrophilic segment represented by the above formula (II). SPAE having DS of 20% was prepared by a method similar to Example 1 except that the charging molar ratio of S-DCDPS and DCBN was changed to 20:80.

In order to make SPAE content 35% by mass, NMP was added thereto and dissolved at 170° C. together with kneading for one night under a nitrogen atmosphere to give a uniform dope for membrane preparation.

After that, the dope was extruded from a double cylindrical nozzle into a hollow shape. At the same time, a mixed liquid of NMP and ethylene glycol was extruded as an inner liquid. The resulting one was made to run in air of an ordinary room temperature for a drying treatment, and then immersed in a coagulation bath. The resulting asymmetric hollow fiber membrane of SPAE was subjected to a washing treatment with water and then subjected to an annealing treatment for 20 minutes using pure water of 90° C.

This hollow fiber membrane was subjected to an alternate layer-by-layer treatment by the entirely same method as in Example 1. Details and evaluated result of the resulting asymmetric hollow fiber membrane are shown in Table 1. When the asymmetric hollow fiber membrane of Comparative Example 4 was compared with the product of Examples, inhibition rates against ion and solute were good, but a water permeability was significantly low. Moreover, since the whole hollow fiber membrane was constituted from SPAE, a collapse pressure was low.

<Evaluation of SPAE Polymers>

A degree of sulfonation and an ion exchange capacity (IEC) of SPAE polymers were evaluated as follows.

Degree of Sulfonation

A polymer (20 mg) dried at 100° C. in a vacuum drier for one night was dissolved in 1 ml of deuterized DMSO (DMSO-d6) manufactured by NACALAI TESQUE, INC. and subjected to a proton NMR using Avance 500 (manufactured by Bruker; frequency: 500.13 MHz; temperature: 30° C.; FT integration: 32 times). In the resulting spectral chart, a relation between protons contained in each of a hydrophobic segment and a hydrophilic segment and peak positions was identified. The degree of sulfonation was determined from a ratio of an integral strength per proton of the independent peak in the hydrophobic segment and the independent peak in the hydrophilic segment.

IEC

Weight of an SPAE polymer dried for one night under a nitrogen atmosphere was measured. Then the polymer was subjected to a stirring treatment with an aqueous solution of sodium hydroxide and to a back titration using an aqueous solution of hydrochloric acid to evaluate the ion exchange capacity (IEC).

<Method for Evaluating the Composite Separation Membrane>

The composite separation membranes of Examples 1 to 15 and Comparative Examples 1 to 4 which were prepared as mentioned hereinabove were subjected to an evaluation for a membrane shape, an evaluation for a thickness of the separation layer and an evaluation for an inhibition property and a permeability property against an ion and a solute.

Shape of Porous Support Membrane

The evaluation of the shape of the porous support membrane samples (hollow fiber membrane) of Examples 1 to 10, 12 to 15, and Comparative Examples 1 to 4 was conducted by the following method. Thus, an SUS plate of 2 mm thickness wherein pores of 3 mm diameter were formed was provided. Then, an appropriate amount of hollow fiber membrane bundles was filled in the pores and cut using a blazer to expose a cross section of the hollow fiber membrane bundles, then a picture of a shape of the cross section was taken using a microscope (ECLIPSE LV100) manufactured by Nikon, an image processing apparatus (DIGITAL SIGHT DS-U2) and a CCD camera (DS-Ri1) manufactured by Nikon. Then, an outer diameter and an inner diameter of the cross section of the hollow fiber membrane were measured by means of a measuring function of an analysis software (NIS Element D3.00 SP6) whereby the outer diameter, the inner diameter and a thickness of the hollow fiber membrane were calculated. The evaluation of a shape of the porous support membrane sample (flat sheet membrane) of Example 11 was conducted in such a manner that a sample in a state of containing water was frozen with liquid nitrogen, cut/broken and dried with air. Pt was subjected to sputtering to the resulting cut/broken area. An observation was conducted under a scanning electron microscope S-4800 manufactured by Hitachi with an accelerated voltage of 5 kV whereby a thickness of the porous support membrane excluding an area of nonwoven fabric of polyester was measured.

Thickness of the First Separation Layer of Composite Separation Membrane Sample

The composite separation membranes or asymmetric hollow fiber membranes of Examples 1 to 15 and Comparative Examples 1 to 4 were subjected to a hydrophilizing treatment using an aqueous solution of ethanol, immersed into water, frozen with liquid nitrogen, cut/broken and dried with air. Pt was subjected to sputtering to the resulting cut/broken area. An observation was conducted under a scanning electron microscope S-4800 manufactured by Hitachi with an accelerated voltage of 5 kV.

Thickness of the Second Separation Layer of Composite Separation Membrane Sample The thickness of the second separation layer can be measured by using a transmission electron microscope. A method for the measurement is shown as hereunder.

The composite separation membranes subjected to an alternate layer-by-layer treatment in Examples 1 to 15 and Comparative Examples 3 to 4 were dipped into a ten-fold diluted solution of a titanium lactate cross-linking agent (TC 310) manufactured by Matsumoto Fine Chemical under a condition of 40° C. for 24 hours whereby a part of residual hydroxyl groups contained in polyvinyl alcohol in the second separation layer was subjected to a cross-linking treatment. By this treatment, titanium element was introduced into the second separation layer whereby a contrast of electron density was imparted. After that, the resulting sample was well washed with water and subjected to an electron staining followed by embedding into an epoxy resin. The embedded sample was ultrafinely sliced using an ultramicrotome followed by subjecting to a vapor deposition with carbon. For an observation under TEM, a transmission electron microscope JEM-2100 manufactured by JEOL was used. The observation was conducted with an accelerating voltage of 200 kV.

Separation Property and Permeation Property of Composite Separation Membrane

After the 30 hollow fiber membranes of any of Examples 1 to 10, 12 to 15 and Comparative Examples 1 to 4 were inserted into a sleeve made of a plastic, a thermosetting resin was injected into the sleeve and hardened to seal. Terminal of the hollow fiber membrane hardened by the thermosetting resin was cut to give an opening of the hollow fiber membrane whereby a module for an evaluation was prepared. This module for the evaluation was connected to a device for testing properties of hollow fiber membrane comprising a tank for feed water and a pump, and the properties were evaluated. The flat sheet membrane of Example 11 was set on a device for evaluating properties of flat sheet membrane comprising a tank for feed water and a pump similar to the above device, and the properties were evaluated. An evaluation condition is as follows. As to a solute, each of sodium chloride (NaCl), magnesium sulfate ($MgSO_4$), sucrose (molecular weight: 342) and glucose (molecular weight: 180) was used. A concentration of the solute was adjusted to 1500 mg/L for all cases. An aqueous solution of each solute was used as a feed solution and a filtration operation was conducted at 25° C. under a pressure of 0.5 MPa for about 30 minutes to 1 hour. After that, water permeated through the membrane was collected and weight of permeated water was measured by an electron balance (LIBROR EB-3200D manufactured by Shimadzu). As to the permeation property, an amount of permeated water when the filtration operation was conducted by using an aqueous solution of NaCl as the feed solution was shown in Table 2. The permeation property was converted to amount of permeated water at 25° C. according to the following formula:

amount of permeated water (L)=weight of permeated water (kg)/0.99704 (kg/L)

A permeation flow rate (FR) is calculated by the following formula:

$FR$[L/m²/day]=amount of the permeated water (L)/ membrane area [m²]/collecting time [minutes]× (60 [minutes]×24 [hours'])

In such a case wherein the feed solution was NaCl or $MgSO_4$, a conductivity was measured for the membrane-permeated water collected in the measurement of the amount of permeated water and for the feed aqueous solution using a conductometric detector (CM-25R manufactured by Toa DKK) and then an ion inhibition rate was calculated by the following formula.

Inhibition rate [%]=(1−Conductivity of the permeated water [μS/cm]/Conductivity of the feed aqueous solution[μS/cm])×100

When the feed solution was sucrose or glucose, a sugar concentration of the water permeated through the membrane and collected in the above measurement and that of the feed aqueous solution were evaluated by a known phenol-sulfuric acid method. To be more specific, 1.0 mL of the above feed solution or permeated water being diluted to 10 fold with pure water was placed in a test tube and stirred after addition of 1.0 mL of 5% aqueous solution of phenol. Then 5.0 mL of concentrated (concentration: 96%) sulfuric acid was quickly added thereonto followed by stirring. The colored solution was subjected to a measurement of an absorbancy at 490 nm, then a concentration was calculated from a previously-prepared calibration curve and a value being multiplied by 10 was used as an actual concentration value. In the phenol-sulfuric acid method, a range wherein a linearity between the sugar concentration and the absorbancy is good is from 0 to 200 mg/L and, therefore, the measurement was conducted in such a manner that the above feed solution or the permeated water of 1500 mg/L was diluted to an extent of ten fold. An inhibition rate of the solute was calculated by the following formula.

Inhibition rate [%]=(1−Sugar concentration of the permeated water [mg/L]/Sugar concentration of the feed aqueous solution[mg/L])×100

With regard to a collapse pressure of the membrane, an operation pressure was raised every 0.05 MPa from a standard measuring pressure of 0.5 MPa and, after an operation was conducted at each pressure for 30 minutes, an amount of permeated water was measured. When the membrane was collapsed, the amount of the permeated water significantly lowered and a changing rate of the amount of the permeated water turned negative. Therefore, a pressure value immediately before the changing rate of the amount of the permeated water turned negative was recorded as a collapse pressure.

TABLE 1

| | | | Example 1 | | Example 2 | | Example 3 | | Example 4 | |
|---|---|---|---|---|---|---|---|---|---|---|
| Porous support membrane | | | PPE | | PPE | | PPE | | PPE | |
| Membrane shape | | | hollow fiber membrane | | hollow fiber membrane | | hollow fiber membrane | | hollow fiber membrane | |
| First separation layer | chemical structure of first separation layer (SPAE) | | formula (I) (II) | | formula (I) (II) | | formula (I) (II) | | formula (I) (II) | |
| | thickness of membrane (i) support membrane (ii) first separation layer | | (i) 50 μm | (ii) 500 nm | (i) 40 μm | (ii) 300 nm | (i) 50 μm | (ii) 300 nm | (i) 50 μm | (ii) 500 nm |
| | outer diameter of membrane | μm | 260 | | 260 | | 260 | | 260 | |
| | degree of sulfonation DS | % | 38 | | 38 | | 44 | | 38 | |
| | ion exchange capacity IEC | meq/g | 1.95 | | 1.95 | | 2.17 | | 1.95 | |

TABLE 1-continued

|  |  |  | Example 1 | Example 2 | Example 3 | Example 4 |
|---|---|---|---|---|---|---|
| Second separation layer | alternately-layered number | — | 4 | 4 | 4 | 2 |
|  | thickness of second separation layer | nm | 20 | 20 | 20 | 20 |
|  | ionomer 1 | — | CPVA | CPVA | CPVA | CPVA |
|  | ionomer 2 | — | APVA | APVA | APVA | APVA |
|  | cross-linking agent | — | GA 1% aqueous solution | GA 1% aqueous solution | GA 1% aqueous solution | GA 1% aqueous solution |
| Membrane property | water permeation property | evaluation condition: feed pressure 0.5 MPa, concentration of solute 1500 mg/L | L/m²/day | 480 | 220 | 520 | 880 |
|  | NaCl inhibition rate |  | % | 50 | 52 | 54 | 34 |
|  | MgSO₄ inhibition rate |  | % | 98.7 | 98.6 | 98.2 | 89.0 |
|  | sucrose removal rate |  | % | 99.8 | 99.2 | 97.5 | 92.0 |
|  | glucose removal rate |  | % | 84 | 86 | 80 | 30 |
|  | collapse pressure |  | MPa | 2.0 | 4.0 | 2.0 | 2.0 |

|  |  |  | Example 5 | Example 6 | Example 7 | Example 8 |
|---|---|---|---|---|---|---|
| Porous support membrane | | | PPE | PPE | PPE | PPE |
| Membrane shape | | | hollow fiber membrane | hollow fiber membrane | hollow fiber membrane | hollow fiber membrane |
| First separation layer | chemical structure of first separation layer (SPAE) | | formula (I) (II) | formula (VI) (VII) | formula (I) (II) | formula (I) (II) |
|  | thickness of membrane (i) support membrane (ii) first separation layer | | (i) 50 µm  (ii) 400 nm | (i) 50 µm  (ii) 150 nm | (i) 50 µm  (ii) 200 nm | (i) 50 µm  (ii) 200 nm |
|  | outer diameter of membrane | µm | 260 | 260 | 260 | 260 |
|  | degree of sulfonation DS | % | 65 | 20 | 20 | 38 |
|  | ion exchange capacity IEC | meq/g | 2.8 | 0.92 | 1.17 | 1.95 |
| Second separation layer | alternately-layered number | — | 3 | 4 | 4 | 8 |
|  | thickness of second separation layer | nm | 20 | 20 | 20 | 30 |
|  | ionomer 1 | — | CPVA | CPVA | CPVA | CPVA |
|  | ionomer 2 | — | APVA | APVA | APVA | APVA |
|  | cross-linking agent | — | GA 1% aqueous solution | GA 1% aqueous solution | GA 1% aqueous solution | GA 1% aqueous solution |
| Membrane property | water permeation property | evaluation condition: feed pressure 0.5 MPa, concentration of solute 1500 mg/L | L/m²/day | 450 | 124 | 150 | 331 |
|  | NaCl inhibition rate |  | % | 52 | 92 | 90 | 63 |
|  | MgSO₄ inhibition rate |  | % | 98.4 | 97.0 | 97.8 | 98.2 |
|  | sucrose removal rate |  | % | 98.2 | 98.8 | 98.5 | 98.6 |
|  | glucose removal rate |  | % | 88 | 92 | 93 | 80 |
|  | collapse pressure |  | MPa | 2.0 | 2.0 | 2.0 | 2.0 |

|  |  |  | Example 9 | Example 10 | Example 11 | Example 12 |
|---|---|---|---|---|---|---|
| Porous support membrane | | | PPE | PPE | PPE | PPE |
| Membrane shape | | | hollow fiber membrane | hollow fiber membrane | flat sheet membrane | hollow fiber membrane |
| First separation layer | chemical structure of first separation layer (SPAE) | | formula (I) (II) | formula (I) (II) | formula (I) (II) | formula (I) (II) |
|  | thickness of membrane (i) support membrane (ii) first separation layer | | (i) 50 µm  (ii) 400 nm | (i) 50 µm  (ii) 500 nm | (i) 40 µm  (ii) 400 nm | (i) 50 µm  (ii) 400 nm |
|  | outer diameter of membrane | µm | 260 | 260 | — | 260 |
|  | degree of sulfonation DS | % | 38 | 38 | 38 | 38 |
|  | ion exchange capacity IEC | meq/g | 1.95 | 1.95 | 1.95 | 1.95 |
| Second separation layer | alternately-layered number | — | 4 | 4 | 4 | 4 |
|  | thickness of second separation layer | nm | 20 | 20 | 20 | 20 |
|  | ionomer 1 | — | CPVA | CPVA | CPVA | PEI |
|  | ionomer 2 | — | APVA | APVA | APVA | APVA |
|  | cross-linking agent | — | OPA 1% aqueous solution | TPA 0.1% aqueous solution | GA 1% aqueous solution | GA 1% aqueous solution |
| Membrane property | water permeation property | evaluation condition: feed pressure 0.5 MPa, concentration of solute 1500 mg/L | L/m²/day | 98 | 332 | 1340 | 380 |
|  | NaCl inhibition rate |  | % | 95 | 44 | 52 | 68 |
|  | MgSO₄ inhibition rate |  | % | 98.0 | 85.0 | 98.5 | 98.2 |
|  | sucrose removal rate |  | % | 99.3 | 85 | 99.2 | 98.6 |
|  | glucose removal rate |  | % | 94 | 27 | 85.0 | 85 |
|  | collapse pressure |  | MPa | 2.0 | 2.0 | >2.0 | 2.0 |

TABLE 1-continued

|  |  |  | Example 13 | Example 14 | Example 15 |
|---|---|---|---|---|---|
| Porous support membrane |  |  | PPE | PPE | PPE |
| Membrane shape |  |  | hollow fiber membrane | hollow fiber membrane | hollow fiber membrane |
| First separation layer | chemical structure of first separation layer (SPAE) |  | formula (I) (II) | formula (I) (II) | formula (I) (II) |
|  | thickness of membrane (i) support membrane (ii) first separation layer |  | (i) 50 μm  (ii) 500 nm | (i) 50 μm  (ii) 300 nm | (i) 50 μm  (ii) 300 nm |
|  | outer diameter of membrane | μm | 260 | 260 | 260 |
|  | degree of sulfonation DS | % | 38 | 38 | 38 |
|  | ion exchange capacity IEC | meq/g | 1.95 | 1.95 | 1.95 |
| Second separation layer | alternately-layered number | — | 4 | 4 | 4 |
|  | thickness of second separation layer | nm | 20 | 20 | 20 |
|  | ionomer 1 | — | PAA | PDADMA | CPVA |
|  | ionomer 2 | — | APVA | APVA | PSS |
|  | cross-linking agent | — | GA 1% aqueous solution | GA 1% aqueous solution | GA 1% aqueous solution |
| Membrane property | water permeation property | evaluation condition: feed pressure 0.5 MPa, concentration of solute 1500 mg/L | L/m²/day | 460 | 720 | 700 |
|  | NaCl inhibition rate |  | % | 48 | 30 | 33 |
|  | MgSO₄ inhibition rate |  | % | 97.2 | 84.0 | 86.0 |
|  | sucrose removal rate |  | % | 98.0 | 85 | 84 |
|  | glucose removal rate |  | % | 76 | 30 | 23 |
|  | collapse pressure |  | MPa | 2.0 | 2.0 | 2.0 |

|  |  |  | Comparative Example 1 | Comparative Example 2 | Comparative Example 3 | Comparative Example 4 |
|---|---|---|---|---|---|---|
| Porous support membrane |  |  | PPE | PPE | PPE | formula (I) (II) |
| Membrane shape |  |  | hollow fiber membrane | hollow fiber membrane | hollow fiber membrane | asymmetric hollow fiber membrane |
| First separation layer | chemical structure of first separation layer (SPAE) |  | formula (I) (II) | formula (I) (II) | formula (I) (II) | — |
|  | thickness of membrane (i) support membrane (ii) first separation layer |  | (i) 50 μm  (ii) 200 nm | (i) 50 μm  (ii) 200 nm | (i) 50 μm  (ii) 200 nm | total thickness of membrane: 35 μm |
|  | outer diameter of membrane | μm | 260 | 260 | 260 | 170 |
|  | degree of sulfonation DS | % | 38 | 20 | 38 | 20 |
|  | ion exchange capacity IEC | meq/g | 1.95 | 1.17 | 1.95 | 1.17 |
| Second separation layer | alternately-layered number | — | — | — | application method | 4 |
|  | thickness of second separation layer | nm | — | — | 80 | 20 |
|  | ionomer 1 | — | — | — | CPVA | CPVA |
|  | ionomer 2 | — | — | — | APVA | APVA |
|  | cross-linking agent | — | — | — | GA 1% aqueous solution | GA 1% aqueous solution |
| Membrane property | water permeation property | evaluation condition: feed pressure 0.5 MPa, concentration of solute 1500 mg/L | L/m²/day | 710 | 110 | 480 | 20 |
|  | NaCl inhibition rate |  | % | 38 | 71 | 30 | 93 |
|  | MgSO₄ inhibition rate |  | % | 12 | 68 | 45 | 99.0 |
|  | sucrose removal rate |  | % | 32 | 58 | 40 | 99.2 |
|  | glucose removal rate |  | % | 15 | 28 | 20 | 89 |
|  | collapse pressure |  | MPa | 2.0 | 2.0 | 2.0 | 0.7 |

INDUSTRIAL APPLICABILITY

In the composite separation membrane in accordance with the present invention, fractionation characteristics for neutral low molecules are drastically improved and, moreover, high water permeability is achieved. Further, a porous support membrane and a separation layer are strongly adhered and, even when it is exposed to chlorine, acid and alkali, excellent separation characteristics and an excellent water permeability are sustained for a long period. Consequently, the membrane is very useful for a nanofiltration treatment and a reverse osmosis treatment.

EXPLANATION OF REFERENCE NUMBER

1: second separation layer
2: first separation layer
3: porous support membrane
4: nonwoven fabric

The invention claimed is:

1. A composite separation membrane for separating an ion and a solute from a liquid, prepared by forming a separation layer on a surface of a porous support membrane, characterized in that the composite separation membrane satisfies conditions of the following (1) to (4):

(1) the porous support membrane contains 50% by mass or more of polyphenylene ether;
(2) the separation layer is constituted from a first separation layer and a second separation layer;
(3) the first separation layer is formed with a thickness of from 50 nm to 1 μm on the surface of the porous support membrane and comprises a sulfonated polyarylene ether copolymer which comprises a repeated structure of a hydrophobic segment represented by the following formula (IV) and a hydrophilic segment represented by the following formula (V); and
(4) the second separation layer is formed with a thickness of from 1 nm to less than 50 nm on a surface of the first separation layer and is an alternately-layered product constituted from one or more kinds of ionomers;

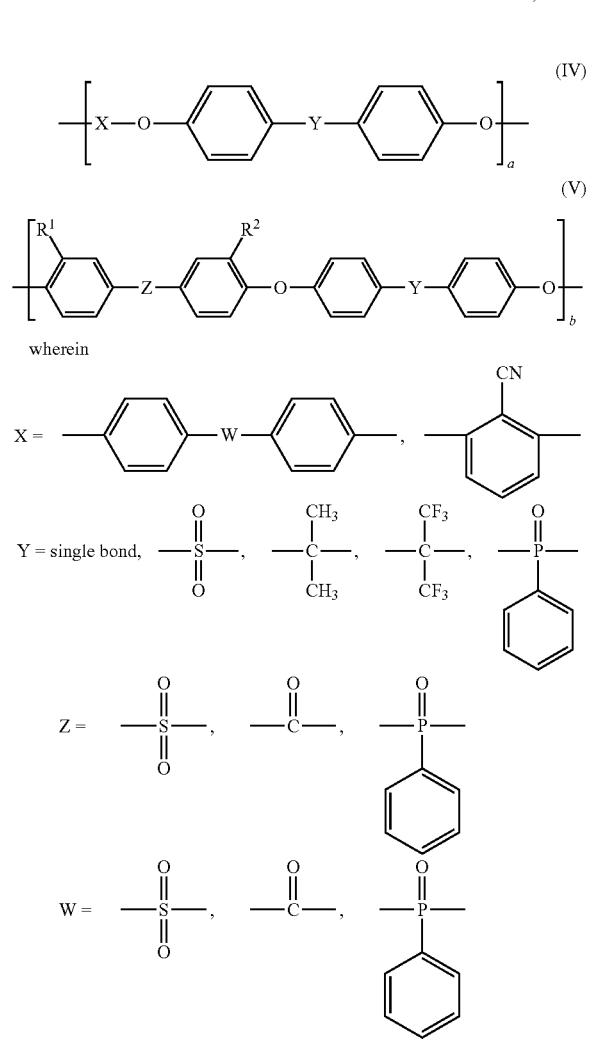

wherein Y and W are not selected as the same thing;
wherein a and b each represents a natural number of 1 or more;
wherein $R^1$ and $R^2$ each represents —$SO_3M$ or —$SO_3H$, wherein M represents a metal element; and
wherein a sulfonation rate in terms of a percent rate of a repeating number of the formula (V) in the sulfonated polyarylene ether copolymer to a total of a repeating number of the formula (IV) and the repeating number of the formula (V) in the sulfonated polyarylene ether copolymer is more than 5% and less than 80%.

2. The composite separation membrane according to claim 1, wherein the sulfonated polyarylene ether copolymer constituting the first separation layer consists of a hydrophobic segment represented by the following formula (I) and a hydrophilic segment represented by the following formula (II);

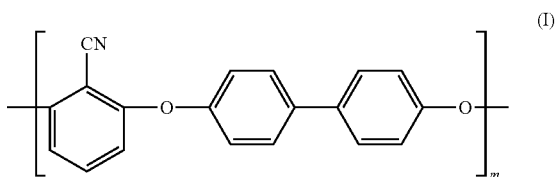

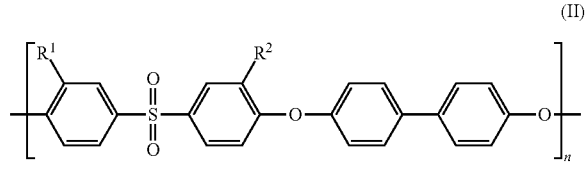

wherein m and n each represents a natural number of 1 or more;
$R^1$ and $R^2$ each represents —$SO_3M$ or —$SO_3H$, wherein M represents a metal element; and
a sulfonation rate in terms of a percent rate of a repeating number of the formula (II) in the sulfonated polyarylene ether copolymer to a total of a repeating number of the formula (I) and the repeating number of the formula (II) in the sulfonated polyarylene ether copolymer is more than 5% and less than 80%.

3. The composite separation membrane according to claim 1, wherein at least one kind of the ionomer constituting the alternately-layered product of the second separation layer is polyvinyl alcohol having a cationic functional group or polyvinyl alcohol having an anionic functional group, and wherein a part of hydroxyl groups of the polyvinyl alcohol ingredient has been subjected to a cross-linking treatment by aldehyde.

4. The composite separation membrane according to claim 1, wherein the porous support membrane contains 80% by mass or more of polyphenylene ether.

5. The composite separation membrane according to claim 1, wherein the thickness of the second separation layer is from 1 nm to 30 nm.

6. A method for producing the composite separation membrane mentioned in claim 1, comprising a step of applying a coating solution on a surface of a porous support membrane containing 50% by mass or more of polyphenylene ether, wherein the coating solution has been prepared by dissolving a sulfonated polyarylene ether copolymer in an aprotic polar solvent containing at least one member selected from dimethyl sulfoxide, N,N-dimethylacetamide, N,N-dimethylformamide, N-methyl-2-pyrrolidone and γ-butyrolactone; a step of subjecting the applied surface to a drying treatment within such a temperature range wherein the solvent does not dissolve the porous support membrane of polyphenylene ether, so as to prepare a composite separation membrane having a first separation layer; and a step of alternately contacting an aqueous solution of at least one kind of ionomer with a surface of the first separation layer, so as to form a second separation layer.

7. The method for producing the composite separation membrane according to claim 6, wherein the method further comprises a step of contacting the second separation layer with an aqueous solution of aldehyde during and/or after forming the second separation layer, so as to subject the second separation layer to a cross-linking treatment.

8. A method for producing the composite separation membrane mentioned in claim 2, comprising a step of applying a coating solution on a surface of a porous support membrane containing 50% by mass or more of polyphenylene ether, wherein the coating solution has been prepared by dissolving a sulfonated polyarylene ether copolymer in an aprotic polar solvent containing at least one member selected from dimethyl sulfoxide, N,N-dimethylacetamide, N,N-dimethylformamide, N-methyl-2-pyrrolidone and γ-butyrolactone; a step of subjecting the applied surface to a drying treatment within such a temperature range wherein the solvent does not dissolve the porous support membrane of polyphenylene ether, so as to prepare a composite separation membrane having a first separation layer; and a step of alternately contacting an aqueous solution of at least one kind of ionomer with a surface of the first separation layer, so as to form a second separation layer.

9. A method for producing the composite separation membrane mentioned in claim 3, comprising a step of applying a coating solution on a surface of a porous support membrane containing 50% by mass or more of polyphenylene ether, wherein the coating solution has been prepared by dissolving a sulfonated polyarylene ether copolymer in an aprotic polar solvent containing at least one member selected from dimethyl sulfoxide, N,N-dimethylacetamide, N,N-dimethylformamide, N-methyl-2-pyrrolidone and γ-butyrolactone; a step of subjecting the applied surface to a drying treatment within such a temperature range wherein the solvent does not dissolve the porous support membrane of polyphenylene ether, so as to prepare a composite separation membrane having a first separation layer; and a step of alternately contacting an aqueous solution of at least one kind of ionomer with a surface of the first separation layer, so as to form a second separation layer.

10. A method for producing the composite separation membrane mentioned in claim 4, comprising a step of applying a coating solution on a surface of a porous support membrane containing 50% by mass or more of polyphenylene ether, wherein the coating solution has been prepared by dissolving a sulfonated polyarylene ether copolymer in an aprotic polar solvent containing at least one member selected from dimethyl sulfoxide, N,N-dimethylacetamide, N,N-dimethylformamide, N-methyl-2-pyrrolidone and γ-butyrolactone; a step of subjecting the applied surface to a drying treatment within such a temperature range wherein the solvent does not dissolve the porous support membrane of polyphenylene ether, so as to prepare a composite separation membrane having a first separation layer; and a step of alternately contacting an aqueous solution of at least one kind of ionomer with a surface of the first separation layer, so as to form a second separation layer.

11. A method for producing the composite separation membrane mentioned in claim 5, comprising a step of applying a coating solution on a surface of a porous support membrane containing 50% by mass or more of polyphenylene ether, wherein the coating solution has been prepared by dissolving a sulfonated polyarylene ether copolymer in an aprotic polar solvent containing at least one member selected from dimethyl sulfoxide, N,N-dimethylacetamide, N,N-dimethylformamide, N-methyl-2-pyrrolidone and γ-butyrolactone; a step of subjecting the applied surface to a drying treatment within such a temperature range wherein the solvent does not dissolve the porous support membrane of polyphenylene ether, so as to prepare a composite separation membrane having a first separation layer; and a step of alternately contacting an aqueous solution of at least one kind of ionomer with a surface of the first separation layer, so as to form a second separation layer.

12. The composite separation membrane according to claim 1, wherein the first separation layer and second separation layer are bonded via an ion bond.

13. The method for producing the composite separation membrane according to claim 6, wherein the method further comprises a step of bonding the first separation layer and second separation layer via an ion bond.

* * * * *